United States Patent
Canning et al.

(10) Patent No.: US 9,742,757 B2
(45) Date of Patent: Aug. 22, 2017

(54) IDENTIFYING AND DESTROYING POTENTIALLY MISAPPROPRIATED ACCESS TOKENS

(71) Applicant: INTERNATIONAL BUSINESS MACHINES CORPORATION, Armonk, NY (US)

(72) Inventors: Simon G. Canning, Upper Coomera (AU); Pranam C. Sreedhar, Punngol Field (SG); Patrick R. Wardrop, Austin, TX (US); Shane B. Weeden, Paradise Point (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 387 days.

(21) Appl. No.: 14/092,252

(22) Filed: Nov. 27, 2013

(65) Prior Publication Data
US 2015/0150110 A1  May 28, 2015

(51) Int. Cl.
*H04L 29/00* (2006.01)
*H04L 29/06* (2006.01)

(52) U.S. Cl.
CPC ...... *H04L 63/0807* (2013.01); *H04L 63/0876* (2013.01); *H04L 63/12* (2013.01); *H04L 63/1441* (2013.01)

(58) Field of Classification Search
CPC .................................. H04L 9/32; G06F 21/00
USPC ............................................. 713/185; 726/9
See application file for complete search history.

(56) References Cited

U.S. PATENT DOCUMENTS

| | | | |
|---|---|---|---|
| 5,920,640 | A | 7/1999 | Salatino et al. |
| 7,877,480 | B2 | 1/2011 | Wardrop |
| 8,447,857 | B2 | 5/2013 | Exton et al. |
| 8,505,085 | B2 | 8/2013 | Logan et al. |

(Continued)

FOREIGN PATENT DOCUMENTS

| | | |
|---|---|---|
| CN | 102842081 A | 12/2012 |
| EP | 1672555 | 11/2007 |

(Continued)

OTHER PUBLICATIONS

Jansen, Wayne A., "Authenticating Users on Handheld Devices", The National Institute of Standards and Technology, Gaithersburg, Maryland, 2003, 13 pages.

(Continued)

*Primary Examiner* — Brandon Hoffman
*Assistant Examiner* — Michael D Anderson
(74) *Attorney, Agent, or Firm* — Jeffrey S. LaBaw; Amy J. Pattillo

(57) ABSTRACT

A computer receives a request for protected user data with an access token presented by a client as authorization for the client to access the protected user data in a delegated environment. The computer parses the request to create a device fingerprint identifying the device submitting the request for the client. The computer compares the device fingerprint of the request to a previously stored device fingerprint of an authorized device associated with the access token. The computer automatically determines whether to identify the access token as potentially misappropriated based on the comparison of the device fingerprint of the request to the previously stored device fingerprint.

20 Claims, 13 Drawing Sheets

(56) References Cited

U.S. PATENT DOCUMENTS

| | | | |
|---|---|---|---|
| 8,543,830 B1* | 9/2013 | Khattar | 713/185 |
| 2009/0172812 A1 | 7/2009 | Mercredi | |
| 2009/0293108 A1 | 11/2009 | Weeden | |
| 2009/0326840 A1 | 12/2009 | Gebara et al. | |
| 2010/0037288 A1* | 2/2010 | Carraher et al. | 726/1 |
| 2010/0323773 A1 | 12/2010 | Ross | |
| 2010/0332319 A1 | 12/2010 | Etchegoyen | |
| 2012/0246494 A1 | 9/2012 | Gebara et al. | |
| 2012/0265631 A1* | 10/2012 | Cronic et al. | 705/26.1 |
| 2013/0247145 A1 | 9/2013 | Gebara et al. | |

FOREIGN PATENT DOCUMENTS

| | | |
|---|---|---|
| EP | 2270737 A1 | 1/2011 |
| WO | 2007012814 A2 | 2/2007 |
| WO | 2010122497 A1 | 10/2010 |
| WO | 2013025599 A2 | 2/2013 |

OTHER PUBLICATIONS

"Using OAuth 2.0 to Access Google APIs", accessed online as of Oct. 8, 2013 from <https://developers.google.com/accounts/docs/OAuth2>, 5 pages.

M. Jones, et al, "The OAuth 2.0 Authorization Framework: Bearer Token Usage", Oct. 2012, accessed online as of Jul. 30, 2013 from <http://self-issued.info/docs/draft-ietf-oauth-v2-bearer.html>, 15 pages.

D. Hardt, "The OAuth 2.0 Authorization Framework", Jul. 31, 2012, IETF Trust, 144 pages.

"How Do I Remove a Game or App That I've Downloaded?", Facebook Help Center, accessed online as of Jul. 30, 2013 from <https://www.facebook.com/help/170585223002660/>, 3 pages.

"OAuth 2.0 workflow", Help—IBM Security, accessed online as of Oct. 8, 2013 from <http://publib.boulder.ibm.com/infocenter/tivihelp/v2r1/index.jsp?topic=%2Fcom.ibm.tivoli.fim.doc_6226%2Fconfig%2Fconcept%2FOAuth20Workflow.html>, 5 pages.

"OAuth Endpoints", Help—IBM Security, accessed online as of Oct. 8, 2013 from <http://publib.boulder.ibm.com/infocenter/tivihelp/v2r1/index.jsp?topic=%2Fcom.ibm.tivoli.fim.doc_6226%2Fconfig%2Fconcept%2FOAuth20Workflow.html>, 4 pages.

PCT International Search Report, International Application No. PCT/CN/2014/089002, filed Oct. 21, 2014, Applicant International Business Machines Corporation et al., mailing date Jan 26, 2015, 12 pages.

* cited by examiner

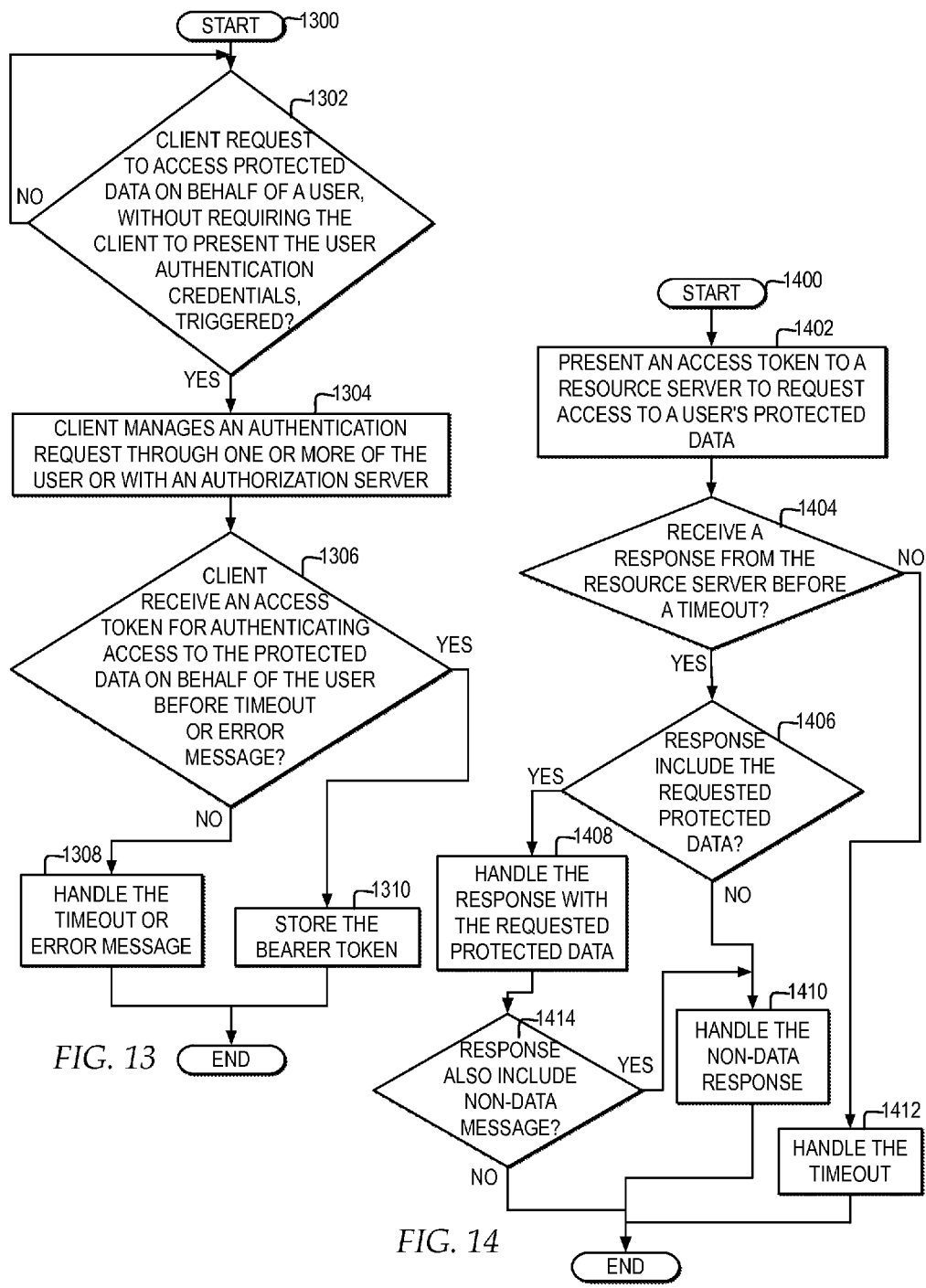

IDENTIFYING AND DESTROYING POTENTIALLY MISAPPROPRIATED ACCESS TOKENS

BACKGROUND

1. Technical Field

This invention relates in general to managing delegated access to protected data and more particularly to automatically identifying and destroying a potentially misappropriated access token which was originally created to provide delegated access to protected data to a bearer of the access token.

2. Description of the Related Art

Delegation protocols, such as OAuth 2.0, allow users to delegate access to protected data owned or controlled by the users. In one example, supported by a delegation protocol, a user may authorize one or more client systems to access protected data that is controlled or owned by the users by authorizing client systems to receive an access token, where a client need only present the access token to authenticate access to the user's protected data. Under a delegation protocol, the access token is sufficient for the client to prove its authorization to access the protected data. Access tokens, however, can be misappropriated and acquired by a client not authorized by the user to access the protected. Once an access token is issued to an authorized client, any other unauthorized client that acquires the access token can also present the access token as authorization to access the user's protected data, using the access token as the authentication for the unauthorized client to access the user's protected data.

BRIEF SUMMARY

The issuance of an access token to a client for the client to access protected data on behalf of a user, under a delegation protocol, allows any client holding the access token to authenticate access to protected data with the user having to share the user's authentication credentials with the client, thus protecting the user's credentials. A limitation of the security provided by access tokens, however, is that once the access token has been issued to a client to present to authenticate access to protected data on behalf of a user, the access token may be misappropriated while active and an unauthorized client bearing the access token may attempt to access protected data by presenting the access token. In view of the foregoing, there is a need for a method, system, and program product for identifying and destroying a potentially misappropriated access token when presented, to block an unauthorized client from accessing protected data on behalf of a client through use of the access token.

In one embodiment, a method for identifying potentially misappropriated access tokens submitted by an unauthorized client in a delegated environment is directed to receiving, by a computer, a request for protected user data with an access token presented by a client as authorization for the client to access the protected user data in a delegated environment. The method is directed to parsing, by the computer, the request to create a device fingerprint identifying the device submitting the request for the client. The method is directed to comparing, by the computer, the device fingerprint of the request to a previously stored device fingerprint of an authorized device associated with the access token. The method is directed to automatically determining, by the computer, whether to identify the access token as potentially misappropriated based on the comparison of the device fingerprint of the request to the previously stored device fingerprint.

In another embodiment, a system for identifying potentially misappropriated access tokens submitted by an unauthorized client in a delegated environment comprises one or more processors and a memory coupled to at least one of the processors. In addition, the system comprises a set of computer program instructions stored in the memory and executed by at least one of the processors in order to perform the actions of receiving a request for protected user data with an access token presented by a client as authorization for the client to access the protected user data in a delegated environment, parsing the request to create a device fingerprint identifying the device submitting the request for the client, comparing the device fingerprint of the request to a previously stored device fingerprint of an authorized device associated with the access token, and automatically determining whether to identify the access token as potentially misappropriated based on the comparison of the device fingerprint of the request to the previously stored device fingerprint.

In another embodiment, a computer program product for identifying potentially misappropriated access tokens submitted by an unauthorized client in a delegated environment comprises a computer readable storage medium having program code embodied therewith. The program code is executable by a computer to receive, by the computer, a request for protected user data with an access token presented by a client as authorization for the client to access the protected user data in a delegated environment, parse, by the computer, the request to create a device fingerprint identifying the device submitting the request for the client, compare, by the computer, the device fingerprint of the request to a previously stored device fingerprint of an authorized device associated with the access token, and automatically determine, by the computer, whether to identify the access token as potentially misappropriated based on the comparison of the device fingerprint of the request to the previously stored device fingerprint.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 13 is a high level logic flowchart of a process and program for a client managing a request to authorize access to protected data on behalf of a user through an access token which allows a client to access protected data without requiring the client to present the user authentication credentials;

FIG. 14 is a high level logic flowchart of a process and program for a client managing a request to access protected data on behalf of a user by presenting an access token alone for authenticating access to the protected data;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

As described herein, embodiments of the invention provide a solution for identifying and destroying misappropriated, and potentially misappropriated, access tokens.

Figure 1:
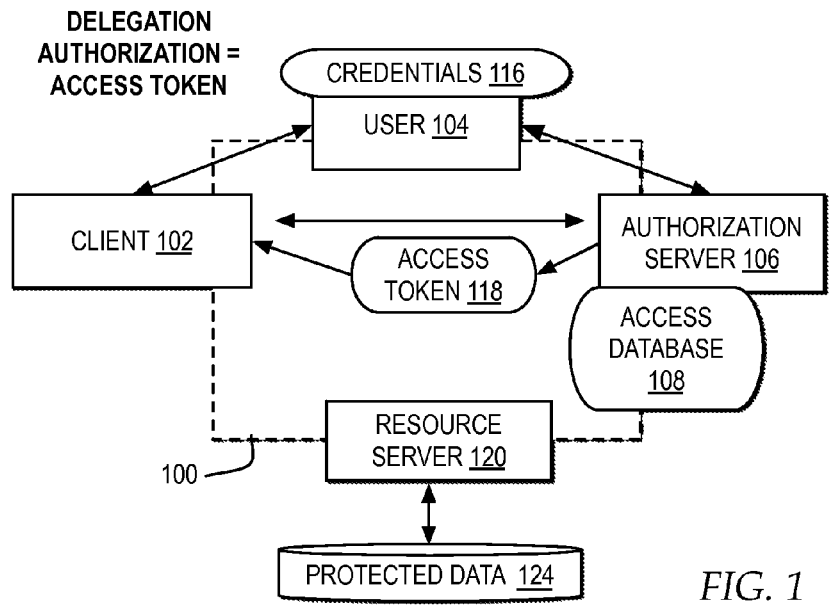
FIG. 1 is a block diagram illustrating one example of a user authorization of a client to access the user's protected data by authorizing an authorization server to issue an access token to the client, where the bearer of the access token may present the access token to a resource server to authenticate access to the protected data.

With reference now to the figures, and in particular with reference now to FIG. 1, a block diagram illustrates one example of a user authorization of a client to access the user's protected data by authorizing an authorization server to issue an access token to the client, where the bearer of the access token may present the access token to a resource server to authenticate access to the protected data.

In the example, a user 104 may represent a resource owner that controls or owns protected data, such as protected data 124, which is hosted by a resource server 120, or other entity. The resource owner is capable of granting access to protected data 124. The resource owner may represent one or more types of entities including, but not limited to, a computing entity, an organization, and a person.

In one example, for user 104 to access protected data 124 hosted by resource server 120, user 104 presents credentials 116 to resource server 120 to authenticate the user's authorization to access protected data 124. Credentials 116 may represent one or more types of identifying information for authenticating a user, including, but not limited to, user name and password, for example. In one example, user 104 may represent a user-agent, such as a web browser or other application or operating system layer, which is used by or authorized by a resource owner of protected data. In another example, user 104 may represent other interfaces or systems implemented by a resource owner of protected data and other protected resources.

In the example illustrated, user 104 may also request that a client 102 access protected data 124 on behalf of user 104 and with the resource owner's authorization. In the example illustrated, for client 102 to request access to protected data 124 on behalf of user 104, client 102 first obtains an access token 118 from authorization server 106, where access token 118 represents an authentication token specified for a client to present to access protected data 124 on behalf of user 104. Next, client 102 may present access token 118 to resource server 120 with a request for protected data 124. In the example, authorization server 106 may only issue access token 118 to client 102 in response to receiving the authentication and approval of user 104. In the example, resource server 120 may be enabled to handle access requests to protected data 124 through one or more of user 104 presenting credentials 116 and through third party clients, such as client 102, presenting access tokens. In one example, authorization server 106 may maintain an access database 108 with a separate record of each issued, active access token stored according to one or more types of identifiers.

In one example, access token 118 represents a string or other structure denoting a specific scope, lifetime, and other access attributes, which provides a limited credential to access protected resources, such as protected data 124. The string or other data structure of access token 118 may be opaque to client 102. Access tokens, such as access token 118, may represent an identifier used to retrieve authorization information for accessing protected data 124 from access database 108 or may self-contain the authorization for accessing protected data 124 in a verifiable manner. Access tokens may have different formats, structures, and methods of use based on the security requirements of a resource server hosting protected data for which the access tokens are issued.

In one example, client 102 may receive an authorization grant, representing the resource owner's authentication, directly from user 104, and present the authorization grant to authorization server 106 to authenticate with authorization server 106 and receive access token 118. In another example, authorization server 106 may serve as an intermediary, where user 104 authenticates directly with authorization server 106 and authorization server 106 redirects access token 118 to client 102, following an authentication process between client 102 and authorization server 106 or through an implicit grant, where authorization server 106 issues access token 118 to client 102 without an intermediate authentication of client 102. In another example, user 104 may pass credentials to client 102 for a one-time use to pass to authorization server 106 directly, for an authorization grant by user 104 to obtain access token 118 from authorization server 106. In additional or alternate embodiments, the entities and roles of entities participating in authenticating the user's authorization for authorization server 106 to issue access token 118 for client 102 may include additional or alternate configurations, entities, and roles.

In the example illustrated, client 102, user 104, authorization server 106, and resource server 120 may implement a delegated protocol layer 100 to handle one or more of the steps implemented for client 102 requesting authorization to access protected data, user 104 authorizing authorization server 106 to issue access token 118 to client 102, authorization server 106 issuing access token 118 to client 102, and resource server 120 authenticating access to protected data 124 through access token 118. In one example, delegated protocol layer 100 may represent one or more layers within each of client 102, user 104, and authorization server 106 implementing the OAuth 2.0 protocol.

In one example, authorization server 106 may be a same server or server entity as resource server 120. In another example, authorization server 106 and resource server 120 are different servers or server entities. Authorization server 106 may issue access tokens for accessing protected resources from resource server 120 alone or for accessing protected resources from multiple resource servers.

In contrast to the example illustrated, in a traditional client-server authentication model, client 102 may request access to protected data on a server by authenticating at resource server 120 using credentials 116, which would require user 104 to share credentials 116 with client 102. In many situations, user 104 may not want to share credentials 116 with client 102 because access to credentials 116 would allow client 102 or other third-parties to gain overly broad access to resources through resource server 120 and other server entities, not limited in scope to a subset of protected data, and without limits on the duration of access unless a user changed the password in credentials 116, which would result in revoking access to all third party client applications. In the example illustrated, by enabling user 104 to authenticate access to protected data 124 at authorization server 106 and delegate access to protected data 124 by authorizing authorization server 106 to issue access token 118 to client 102, user 104 delegates access to protected data 124, on behalf of user 104, by client 102 presenting access token 118 to resource server 120, without user 104 needing to share credentials 116 with client 102.

Figure 2:
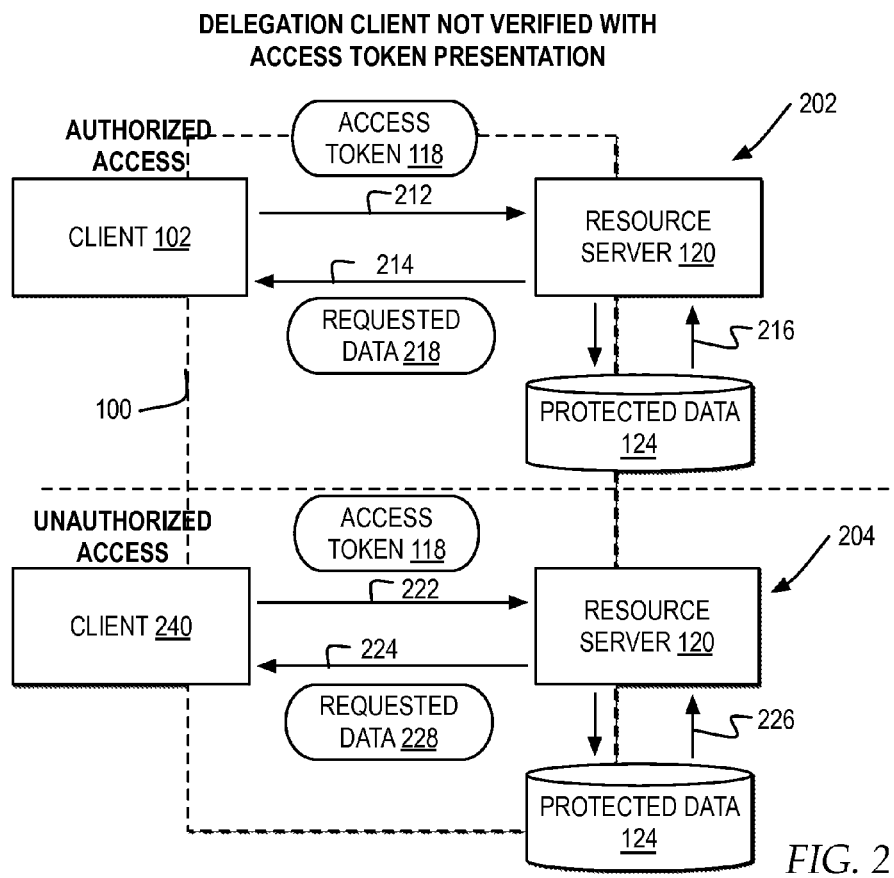
FIG. 2 is a block diagram illustrating one example of the results of both an authorized client and unauthorized client presenting an active access token to a resource server for delegated access to protected data, where the resource server verifies the access token for the delegated access to the protected data and provides delegated access to protected data to the bearer of the access token, without requiring a separate verification of whether the bearer of the access token is an authorized bearer of the access token.

FIG. 2 illustrates a block diagram of one example of the results of both an authorized client and unauthorized client presenting an active access token to a resource server for delegated access to protected data, where the resource server verifies the access token for the delegated access to the protected data and provides delegated access to protected data to the bearer of the access token, without requiring a separate verification of whether the bearer of the access token is an authorized bearer of the access token.

In a first example illustrated at reference numeral 202, client 102, which has been issued access token 118 by authorization server 106, as illustrated in FIG. 1, is authorized to use access token 118 to request delegated access to protected data 124. In the example, client 102 passes access token 118 to resource server 120, along with a request for protected data 124 illustrated at reference numeral 212. In the example, resource server 120 verifies access token 118, and in response to verifying access token 118, accesses protected data 124, as illustrated at reference numeral 216. In particular, in the example, resource server 120 may verify access token 118 by verifying that the authorization information accessed using an identifier in access token 118 allows access to protected data 124 or by verifying the self-contained authorization information in access token 118. In addition, while resource server 120 may verify that a record for access token 118 is present and active in access database 108, to verify that user 104 has not removed access token 118 from the list of authorized accessed tokens or that the active period for access token 118 has not expired, resource server 120 does not verify that the client presenting access token 118 is authorized to bear and present access token 118 or receive delegated access to protected data 124. Moreover, while in one example, in order to provide additional security resource server 120 may require a one-time authentication of the identity of client 102 upon presentation of access token 118 in order to record an authenticated identifier of client 102, resource server 120 may not need to also verify that the identity of a bearer of access token 118 is authorized to present access token 118. Resource server 120 returns the portion of protected data 124 authorized within the scope of access token 118, as requested data 218, to client 102, as illustrated at reference numeral 214.

One limitation of a delegated protocol system in which any bearer of an access token can present access token 118 and receive delegated access to protected data 124 is that if access token 118 is misappropriated, unauthorized accesses to protected data 124 may be allowed. For example, in the example illustrated at reference numeral 204, client 240, which is not authorized by user 104 to access protected data 124, has obtained access token 118. In the example illustrated at reference numeral 204, client 240 is not authorized to bear access token 118 or receive delegated access to protected data 124, therefore access token 118 has been potentially misappropriated. In the example, client 240 passes access token 118 to resource server 120, along with a request for delegated access to protected data 124, as illustrated at reference numeral 222. In the example, resource server 120 verifies access token 118, and in response to verifying access token 118, accesses protected data 124, as illustrated at reference numeral 226. Resource server 120 returns the portion of protected data 124 authorized within the scope of access token 118 as requested data 228 to client 240, as illustrated at reference numeral 224.

In the second example illustrated at reference numeral 204, because resource server 122 verifies that access token 118 authorizes delegated access to protected data 124 without also verifying that the client submitting access token 118 is authorized to bear or present access token 118, once client 240 obtains access token 118, client 240 is also able to access protected data 124. In the example, where client 240 is referred to as obtaining access token 118, client 240 may also have obtained a copy of access token 118.

In the first example illustrated at reference numeral 202 and the second example illustrated at reference numeral 204, while a user may manually elect to withdraw third party, delegated access to protected data 124 through the presentation of access token 118, by removing or deactivating the record of access token 118 from access database 108, these steps for deactivating access token 118 require a user to know how to select to withdraw a third party from an access list in access database 108 and may also require a user to know that there is a risk of an unauthorized access by an unauthorized client using access token 118. In an example where user 104 represents an individual user logged into a social media service, where the user may authorize a third party client via a redirection by the social media service to access the user's protected data, it may not be reasonable to expect the user of the social media service to be aware of unauthorized accesses to the access token issued to the third party client or to expect the user of the social media service to know how to take the steps to deauthorize the third party client, in order to deactivate the delegated access provided by the access token issued to the third party client. In addition, the third party client may not be aware of unauthorized accesses to the access token issued to the third party client. Moreover, removing a record of an access token from access database 108 alone may not destroy the access token and depending on data transmission speeds, cache update policies, and other data related issues, additional cache invalidation steps may be required to prevent resource server 120 from continuing to release protected data 124 in response to the presentation of the access token.

In addition, in the first example illustrated at reference numeral 202 and the second example illustrated at reference numeral 204, while a user may set an active lifetime for access token 118 when it is issued by authorization server 106, and the user may set the active lifetime to a short period, client 240 may still obtain an unauthorized copy of access token 118 and submit access token 118 to resource server 122 prior to the lifetime of access token 118 expiring, for an unauthorized delegated access to protected data 124.

In addition, in the first example illustrated at reference numeral 202 and the second example illustrated at reference numeral 204, while resource server 120 may require that client 102 or client 240 authenticate itself as an authorized client of resource server 120 prior to accessing protected data, in the example, access token 118 is not limited by authentication by a particular client and if client 240 is able to authenticate itself as an authorized client of resource server 120, client 240 may still misappropriate access token 118 and access protected data 124 by presenting access token 118 to resource server 120 as an authorized client of resource server 120.

As illustrated by the authorized and unauthorized access to protected data 124 using access token 118, resource server 120 does not verify that client 102 or client 240 are authorized to present access token 118 to receive delegated access to protected data 124. As illustrated in FIG. 2, because the result of resource server 120 not verifying that client 102 or client 240 are authorized to present access token 118 to receive delegated access to protected data 124 is an unauthorized access to protected data 124 merely through the presentation of a misappropriated access token, there is a need for resource server 120, in response to the presentation of access token 118, to automatically identify and manage destruction of potentially misappropriated access tokens, without expecting the user to deauthorize or invalidate an access token in access database 108 and without relying solely on setting an access token with a short lifetime to prevent an attempt to present a misappropriated access token.

Figure 3:
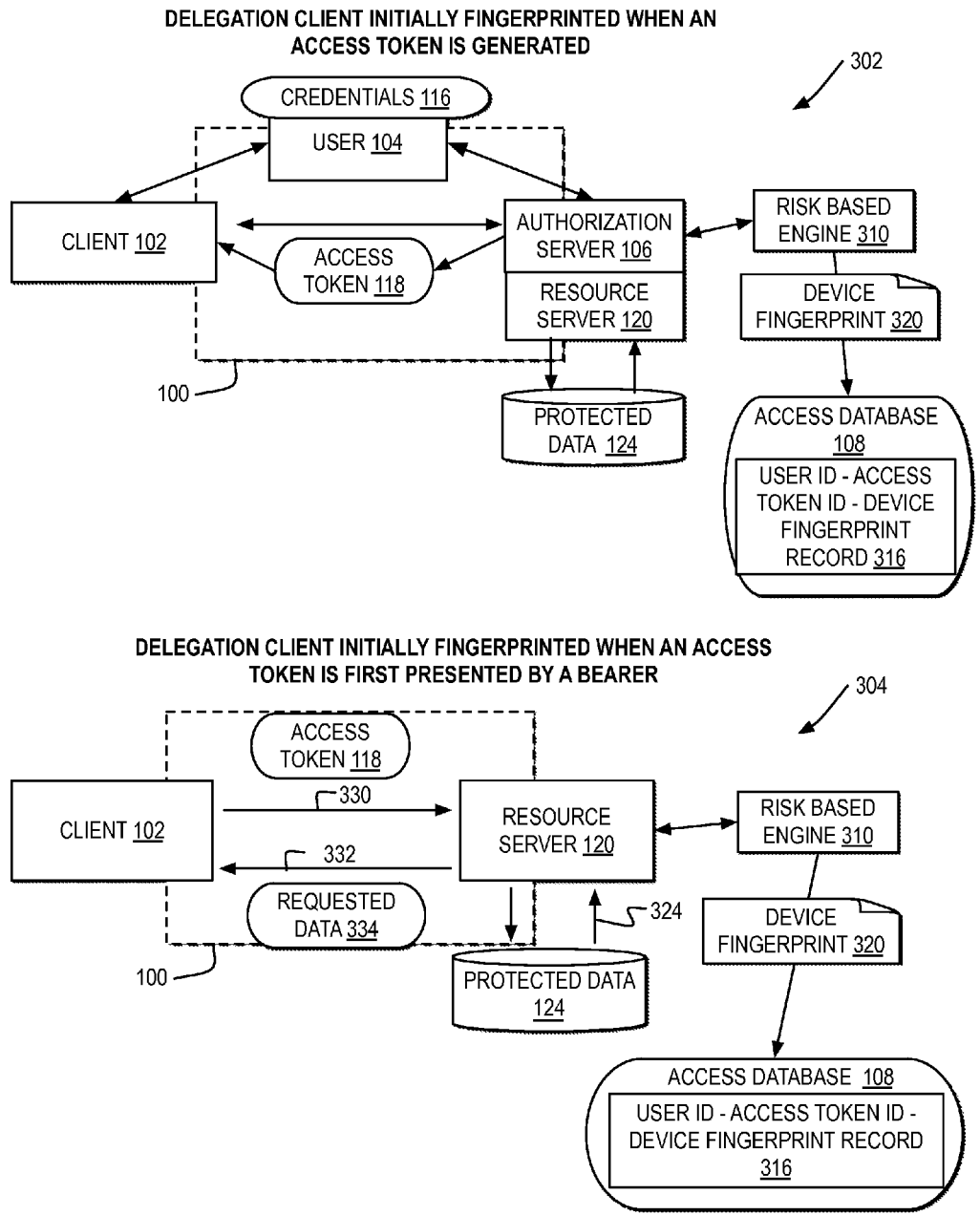
FIG. 3 is a block diagram illustrating one example of a delegated environment in which the client receiving an access token is fingerprinted concurrent with the authorization server generating an access token for use by the client for delegated access to protected data or in which a resource server parses and stores a fingerprint of a client presenting an access token the first time the access token is presented to the resource server.

FIG. 3 illustrates a block diagram of examples of a delegated environment in which the client receiving an access token is fingerprinted concurrent with the authorization server generating an access token for use by the client for delegated access to protected data or in which a resource server parses and stores a fingerprint of a client presenting an access token the first time the access token is presented to the resource server.

In a first example illustrated at reference numeral 302, within a delegated environment, implementing delegated protocol layer 100, authorization server 106 may be set to initially parse a fingerprint of client 102, concurrent with authorizing and issuing access token 118, on behalf of user 104, for delegated access to protected data 124. In the example illustrated, authorization server 106 may be set to parse a fingerprint of client 102, concurrent with authorizing and issuing access token 118, in the example where authorization server 106 and resource server 120, which controls access to protected data 124, are provided by a same entity. In another example, authorization server 106 may be set to parse a fingerprint of client 102, concurrent with authorizing and issuing access token 118, in the example where authorization server 106 and resource server 120 are provided by different entities.

In the example illustrated at reference numeral 302, during the process of generating access token 118 and issuing access token 118 to client 102, authorization server 106 may parse a fingerprint of client 102 and call a risk based engine 310 to store the parsed fingerprint, illustrated as device fingerprint 320, in access database 108. Authorization server 106 may parse a fingerprint of client 102 by detecting one or more characteristics of client 102 identifiable from one or more of the presentation of access token 118, any authentication flow including a client registration record, and requests for additional characteristics. In the example, device fingerprint 320 may refer to one or more identified characteristics of a client device including, but not limited to, an internet protocol (IP) address, an IP address subnet, a time zone, a client identifier (ID), a user name, a system font, a cookies enablement setting, a hardware type, and other types of information identifiable from or about client 102.

In the example illustrated at reference numeral 302, access database 108 may include a record for each active access token that also includes a user identifier, an access token identifier, and a device fingerprint, as illustrated by record 316. In particular, in one example, authorization server 106 may initially create a record in access database 108, upon generation of an access token, with a user identifier for user 104 and an access token identifier for uniquely identifying access token 118. In the example, authorization server 106 may update the record in access database 108, for the identified access token, with the parsed fingerprint of the client to which the access token is issued identified as device fingerprint 320.

In the example illustrated at reference numeral 302, risk based engine 310 may return a confirmation to authorization server 106 indicating that device fingerprint 320 has been stored in access database 108. Authorization server 106 may wait to receive the confirmation from risk based engine 310 before issuing access token 118 to client 102.

In a second example illustrated at reference numeral 304, within the delegated environment, an initial device fingerprint is not parsed and stored in access database 108 with an access token record until the first time the access token is presented to the resource server by a bearer of the access token. In the example illustrated at reference numeral 304 implementing delegated protocol layer 100, resource server 120 is set to parse a fingerprint of the each client that presents access token 118. In the example, client 102 submits access token 118 to resource server 120, as illustrated at reference numeral 330. In the example, during the process of handling a delegated access to protected data 124 in response to client 102 presenting access token 118, resource server 120 may parse a fingerprint of client 102 and call risk based engine 310 with the parsed fingerprint, illustrated as device fingerprint 320. Risk based engine 310 detects that no fingerprint has been stored for access token 118 in access database 108 and stores device fingerprint 320 in record 316, the record within access database 108 for access token 118. Risk based engine 310 may return a confirmation to resource server 120 indicating that device fingerprint 320 has been stored in access database 108 as a first device fingerprint for the access token. Resource server 120, upon verifying that access token 118 is valid, may retrieve protected data 124, as illustrated at reference numeral 324 and return the protected data as requested data 334 to client 102, as illustrated at reference numeral 332.

Figure 4:
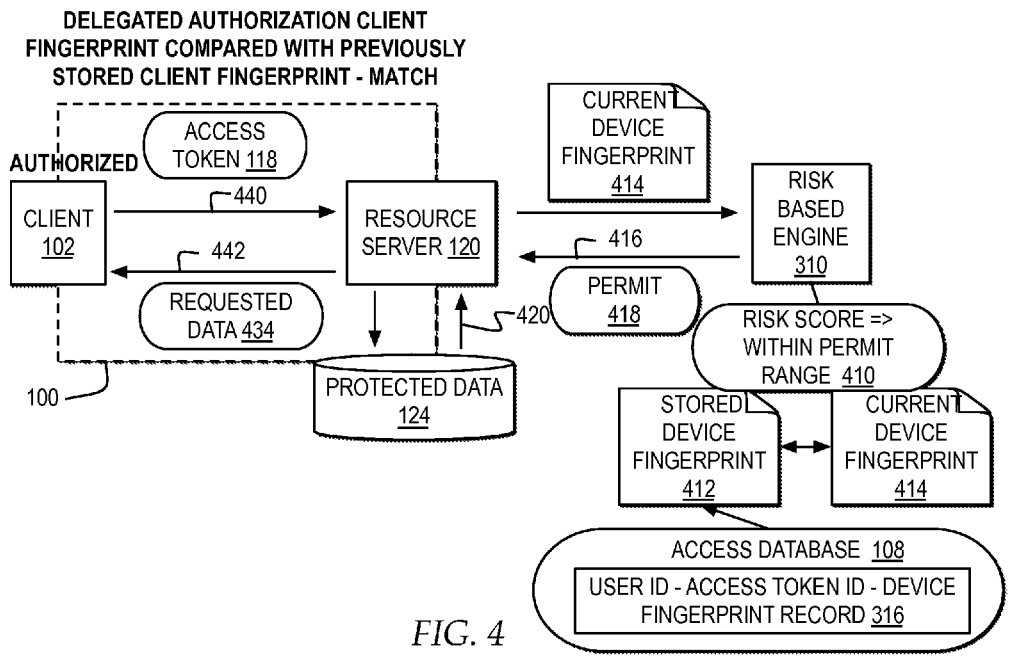
FIG. 4 is a block diagram illustrating one example of a delegated environment in which a resource server detects a match between a previously stored device fingerprint associated with an access token and a device fingerprint of a client currently presenting the access token and allows the client delegated access to protected data accessible through the access token.

FIG. 4 illustrates a block diagram of one example of a delegated environment in which a resource server detects a match between a previously stored device fingerprint associated with an access token and a device fingerprint of a client currently presenting the access token and allows the client delegated access to protected data accessible through the access token.

In the example, client 102, which was issued access token 118 in response to user 104 authorizing client 102 to have delegated access to protected data through access token 118, presents access token 118 to resource server 120, as illustrated at reference numeral 440. In the example, when resource server 120 receives access token 118, resource server 120 parses a fingerprint of client 102 and calls risk based engine 310 with the parsed fingerprint of client 102, illustrated as current device fingerprint 414.

In the example, risk based engine 310 accesses, from access database 108, a record for access token 118, which includes a previously stored device fingerprint 412 of the client device that previously presented access token 118 to resource server 120. In the examples illustrated in FIG. 3, stored device fingerprint 412 is device fingerprint 320, captured from client 102 either concurrent with issuing access token 118 or upon the first presentation of access token 118 to resource server 120. In the example, risk based engine 310 accesses one or more risk score factors and calculates a risk score indicating the probability that stored device fingerprint 412 matches with current device fingerprint 414. In one example, risk based engine 310 may compare a calculated risk score with a risk table that includes ranges of scores, where one range of scores is designated as a "permit range" of scores that indicate a match probability between stored device fingerprint 412 and current device fingerprint 414 indicative of the access token being presented by a client that is authorized to bear and present access token 118. In the example illustrated, as illustrated at reference numeral 410, the calculated risk score is within the "permit range".

In the example, risk based engine 310 detects the risk score within the "permit range", as illustrated at reference numeral 410, and returns a permission response of permit 418, as illustrated at reference numeral 416. Resource server 120 receives a permission response of permit 418 and, responsive to verifying access token 118 as an active, issued token, resource server 120 retrieves the requested selection of data from protected data 124, as illustrated at reference numeral 420, and returns requested data 434 to client 102, as illustrated at reference numeral 442.

Figure 5:
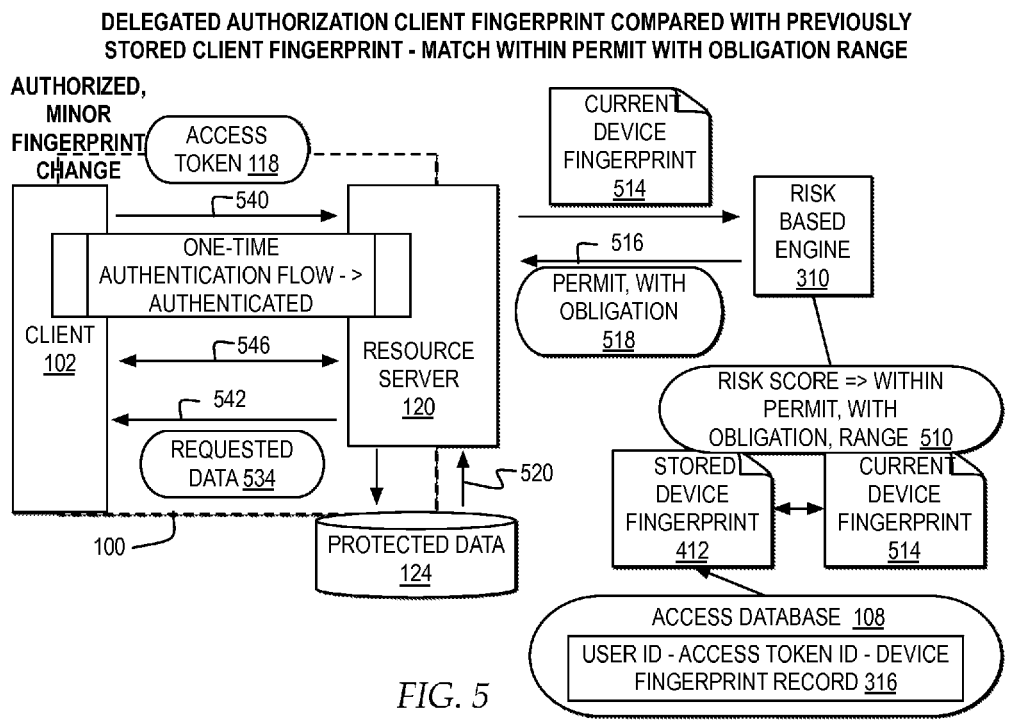
FIG. 5 is a block diagram illustrating one example of a delegated environment in which a resource server detects a match within a permit with obligation range between a previously stored device fingerprint associated with an access token and a device fingerprint of a client currently presenting the access token and allows the client delegated access to protected data accessible through the access token only after a one-time authentication by the client.

FIG. 5 illustrates a block diagram of one example of a delegated environment in which a resource server detects a match within a permit with obligation range between a previously stored device fingerprint associated with an access token and a device fingerprint of a client currently presenting the access token and allows the client delegated access to protected data accessible through the access token only after a one-time authentication by the client.

In the example, client 102, which was issued access token 118 in response to user 104 authorizing client 102 to have delegated access to protected data through access token 118, presents access token 118 to resource server 120, as illustrated at reference numeral 540. In the example, when resource server 120 receives access token 118, resource server 120 parses a fingerprint of client 102 and calls risk based engine 310 with the parsed fingerprint of client 102, illustrated as current device fingerprint 514.

In the example, risk based engine 310 accesses, from access database 108, a record for access token 118, which includes a previously stored device fingerprint 412 of the client device that previously presented access token 118 to resource server 120. In the examples illustrated in FIG. 3, stored device fingerprint 412 is device fingerprint 320, captured from client 102 either concurrent with issuing access token 118 or upon the first presentation of access token 118 to resource server 120.

In the example, while client 102 was originally issued access token 118, from the time at which an initial device fingerprint for client 102 was captured and stored in record 316 as stored device fingerprint 412, and the present time, a characteristic of the device fingerprint of client 102 has changed. For example, a network address assigned to client 102 may have changed from the network address recorded in stored device fingerprint 412 in comparison with the network address recorded in current device fingerprint 514.

In the example, risk based engine 310 accesses one or more risk score factors and calculates a risk score indicating the probability that stored device fingerprint 412 matches with current device fingerprint 514. In one example, risk based engine 310 may compare a calculated risk score with a risk table that includes ranges of scores, where one range of scores is designated as a "permit with obligation range" of scores that indicate a match probability between stored device fingerprint 412 and current device fingerprint 514 indicative of the access token being presented by a client that is most likely a client that is authorized to bear and present access token 118, however additional obligations are required before the client can access the protected data. In one example, a risk score that is within the "permit, with obligation, range" may indicate that there are differences between stored device fingerprint and current device fingerprint 514, but that the differences are not indicative of a misappropriation of access token 118. In the example illustrated, as illustrated at reference numeral 510, the calculated risk score is within the "permit, with obligation, range".

In the example, risk based engine 310 detects the risk score within the "permit, with obligation, range", as illustrated at reference numeral 510, and returns a permission response of permit, with obligation 518, as illustrated at reference numeral 516. Resource server 120 receives a permission response of permit, with obligation 518 and, manages a flow for requiring client 102 or another system to meet the obligation set either by resource server 120, risk based engine 310, or another entity, for a permit, with obligation response. In one example, an obligation set for the response of permit, with obligation 518 is an obligation for the presenting client to perform a one-time identity authentication. In the example, resource server 120, through redirection to authorization server 106 or directly with resource server 120, manages a one-time authentication flow 546 with client 102. In the example, response to resource 120 receiving an indication that client 102 has been authenticated through one-time authentication flow 546, and responsive to verifying access token 118 as an active, issued token, resource server 120 retrieves the requested selection of data from protected data 124, as illustrated at reference numeral 520, and returns requested data 534 to client 102, as illustrated at reference numeral 542.

Figure 6:
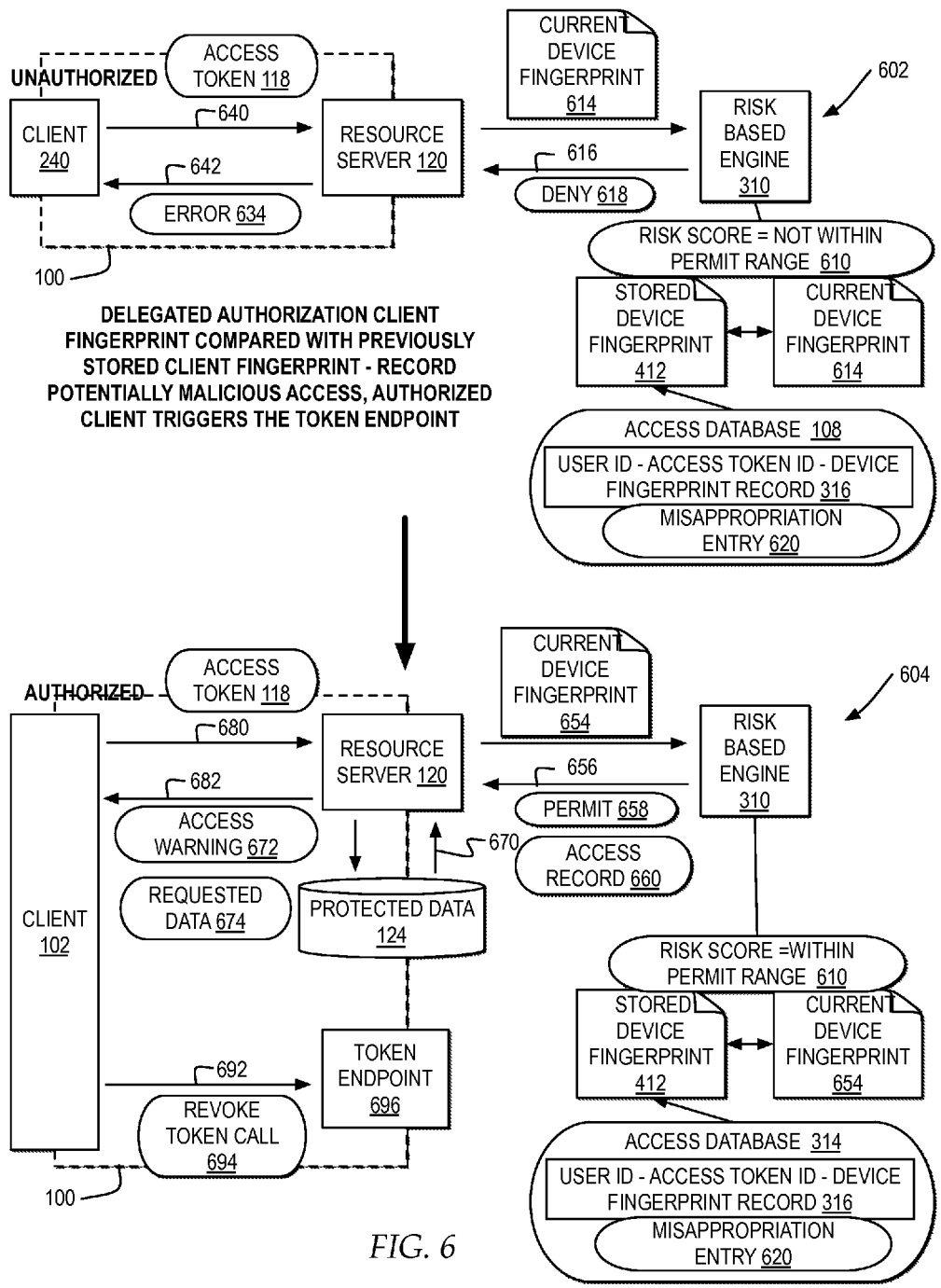
FIG. 6 is a block diagram illustrating one example of a delegated environment in which a resource server detects that there is not a match between a previously stored device fingerprint associated with an access token and a current device fingerprint of a client currently presenting the access token, denies the current client access to protected data, and alerts an authorized client system, on a next presentation of the access token, that the access token has been potentially misappropriated, to allow the client to trigger an endpoint to revoke the access token.

FIG. 6 illustrates a block diagram of one example of a delegated environment in which a resource server detects that there is not a match between a previously stored device fingerprint associated with an access token and a current device fingerprint of a client currently presenting the access token, denies the current client access to protected data, and alerts an authorized client system, on a next presentation of the access token, that the access token has been potentially misappropriated, to allow the client to trigger an endpoint to revoke the access token.

In the example illustrated at reference numeral 602, client 240, which was not issued access token 118 and is not authorized as a bearer or access token 118, has accessed a misappropriated version of access token 118, directly or indirectly. Client 240 presents access token 118 to resource server 120, as illustrated at reference numeral 640. In the example, when resource server 120 receives access token 118, resource server 120 parses a fingerprint of client 240 and calls risk based engine 310 with the parsed fingerprint of client 240, illustrated as current device fingerprint 614.

In the example illustrated at reference numeral 602, risk based engine 310 accesses, from access database 108, a record for access token 118, which includes a previously stored device fingerprint 412 of the client device that previously presented access token 118 to resource server 120. In the examples illustrated in FIG. 3, stored device fingerprint 412 is device fingerprint 320, captured from client 102 either concurrent with issuing access token 118 or upon the first presentation of access token 118 to resource server 120.

In the example illustrated at reference numeral 602, risk based engine 310 accesses one or more risk score factors and calculates a risk score indicating the probability that stored device fingerprint 412 matches with current device fingerprint 614. In one example, risk based engine 310 may compare a calculated risk score with a risk table that includes ranges of scores, where one range of scores is designated as a "not within permit range" of scores that indicate a match probability between stored device fingerprint 412 and current device fingerprint 614 indicative of the access token having been misappropriated and the current bearer not being the entity that the user intended to bear the access token. In one example, a risk score that is within the "not within permit range" may indicate that there are differences between stored device fingerprint and current device fingerprint 614 indicative of a misappropriation of access token 118. In the example illustrated, as illustrated at reference numeral 610, the calculated risk score is within the "not within permit range".

In the example, risk based engine 310 detects the risk score within the "not within permit range", as illustrated at reference numeral 610, and returns a permission response of deny 618, as illustrated at reference numeral 616. When resource server 120 receives a permission response of deny 618, resource server 120 denies any access to data identified in access token 118, generates an error message 634, and sends error message 634 to client 240, as illustrated at reference numeral 642. Error message 634 may include different types of information indicating why the access token request failed.

In the example illustrated at reference numeral 602, when risk based engine 310 calculates a risk score of "not within permit range", risk based engine 310 may add a misappropriation entry 620 to record 316 for the access token, where entry 620 provides a record of the device fingerprint, date, time, and other information related to the access which was denied. In the example, by recording misappropriation entry 620 for the denied access by client 240, one or more entities, including user 104, may access information about each presentation of access token 118 that is denied. In additional embodiments, risk based engine 310 may also maintain a log of each access scored by risk based engine 310, and the response scored for each access.

Next, in the example illustrated at reference numeral 604, after client 240 has presented access token 118 to resource server 120 and been denied access to protected data, client 102 presents access token 118 to resource server 120, as illustrated at reference numeral 680. Resource server 120 captures and parses a device fingerprint of client 102, illustrated as current device fingerprint 654, and calls risk based engine 310 with current device fingerprint 654.

In the example illustrated at reference numeral 604, risk based engine 310 accesses, from access database 108, a record for access token 118, which includes a previously stored device fingerprint 412 of the client device that previously presented access token 118 to resource server 120. In the examples illustrated in FIG. 3, stored device fingerprint 412 is device fingerprint 320, captured from client 102 either concurrent with issuing access token 118 or upon the first presentation of access token 118 to resource server 120.

In the example illustrated at reference numeral 604, risk based engine 310 accesses one or more risk score factors and calculates a risk score indicating the probability that stored device fingerprint 412 matches with current device fingerprint 614. In one example, risk based engine 310 may compare a calculated risk score with a risk table that includes ranges of scores, where one range of scores is designated as a "within permit range" of scores that indicate a match probability between stored device fingerprint 412 and current device fingerprint 614 indicative of the access token currently being presented by the same client that was originally issued the access token. In the example illustrated, as illustrated at reference numeral 610, the calculated risk score is within the "within permit range".

In the example illustrated at reference numeral 604, risk based engine 310 detects the risk score within the "within permit range", as illustrated at reference numeral 610, and returns a permission response of permit 658, as illustrated at reference numeral 656. When resource server 120 receives a permission response of permit 658, responsive to validating access token 118 as an issued, active access token, resource server 120 access protected data 124 as authorized by access token 118, as illustrated at reference numeral 670, and returns the protected data as requested data 674, as illustrated at reference numeral 682.

In addition, in the example illustrated at reference numeral 604, when risk based engine 310 accesses stored device fingerprint 412 from access database 314, risk based engine 310 also receives misappropriation entry 620. When risk based engine 310 detects that the current risk score is "within permit range" and misappropriation entry 620 for the presented access token, risk based engine 310 also returns an access record 660 to resource server 120, as illustrated at reference numeral 656. Access record 660 may include different levels of information about the potentially misappropriated token access by client 240, where the level of information is dependent upon the level of information stored in misappropriation entry 620 and dependent upon optional settings applied by risk based engine 310 to filter the information. Access record 660 may include, but is not limited to including, current device fingerprint 614 if stored in misappropriation entry 620, a time and date when misappropriation entry 620 was logged, a number of times the same client attempted to present the access token and was denied access, and other information logged in misappropriation entry 620 about denied accesses.

In the example illustrated at reference numeral 604, resource server 120 responds to receiving access record 660 by generating an access warning message 672 and sending access warning message 672 to client 102, as illustrated at reference numeral 682. Access warning message 672 may include a message indicating that the access token was potentially misappropriated and provide information about the presentation of the access token that was denied. In particular, in one example, resource server 120 may generate an access warning message 672 that includes the following content:

```
HTTP/1.1 401 Unauthorized
    WWW-Authenticate: Bearer realm="example",
        error="stolen token",
        error_description="The access token might have been
        misappropriated."
```

In the example, the error message includes both an error type of "stolen_token" and an error description of "The access token might have been misappropriated". In additional or alternate embodiments, access warning message 672 may also include a website address or other network information for a token endpoint 696 that can be called by client 102 to trigger revocation of access token 118.

In the example illustrated at reference numeral 604, client 102, responsive to receiving access warning message 672, may be set to automatically trigger a revoke token call 694, as illustrated at reference numeral 692, to token endpoint 696. In particular, in one example, client 102 may generate revoke token call 694 that includes the following content:

```
POST/token HTTP/1.1
    Host: server.example.com
    Authorization: Basic czZCaGRSa3FOMzpnWDFmQmF0M2JW
    Content-Type: application/x-www-form-urlencoded
    grant_type=destroy_token&access_token=
    tGzv3JOkF0XG5Qx2TIKWIA
```

In the example content, the "server.example.com" address for the "host" represents the address for token endpoint 696 and the "grant_type" of "destroy_token&access_token" triggers token endpoint 696 to automatically destroy the access token identified as "tGzv3JOkFOXG5Qx2TIKWIA".

By providing client 102 with a warning message indicating an access token originally issued to client 102 has been potentially misappropriated and enabling client 102 to automatically trigger a token endpoint to revoke the access token, client 102 is notified of and may directly manage potential misappropriations of access tokens issued to it. In one example, when token endpoint 696 receives revoke token call 694, token endpoint 696 may automatically manage a flow of instructions to destroy the access token identified in revoke token call 694. In another example, access warnings 672 may include an authorization code that allows client 102 to trigger token endpoint 696 to revoke access token 118 and token endpoint 696 may first verify the authorization code in revoke token call 694 before managing the flow of instructions to destroy the access token identified in revoke token call 694. In another example, when token endpoint 696 receives revoke token call 694, token endpoint 696 may require a one-time authentication by client 102 to verify an identity of client 102, prior to automatically managing the flow of instructions to destroy the access token identified in revoke token call 694.

In one example, token endpoint 696 is defined by a network address that can be called to trigger a request to access, verify, or revoke an access token. In one example, a network address of token endpoint 696 may be extended to specify a network address to call to revoke an access token through token endpoint 696. In one example, token endpoint 696 may be implemented as a service or function of authorization server 106, where token endpoint 696 may be called by the client to request an access token and to revoke an access token. In another embodiment, token endpoint 696 may be a functional component of resource server 120 or other systems implemented within delegated environment 100.

In the examples illustrated in FIG. 6, by implementing risk based engine 310 as a service of resource server 120, resource server 120 can provide an additional layer of security to accesses to protected data that are based on the presentation of an access token and can provide an additional layer of security to clients originally issued access tokens to enable authorized clients to identify and destroy potentially misappropriated access tokens. In contrast to the example illustrated at reference numeral 204 where access token 118 has been misappropriated and client 240 receives unauthorized access to protected data by presenting access token 118, in the example illustrated at reference numeral 602, risk based engine 310 detects that client 240 has most likely presented a misappropriated access token and directs resource server 120 to deny access to protected data. In contrast to the example illustrated at reference numeral 204 where client 102 would not know that client 240 had presented misappropriated copy of access token 118 and received access to protected data, in the example illustrated at reference numeral 604, risk based engine 310 tracks information about the accesses with potentially misappropriated access tokens, provide the information about the misappropriated access token to client 102, and allows for client 102 to select to automatically trigger token endpoint 696 to destroy access token 118.

Figure 7:
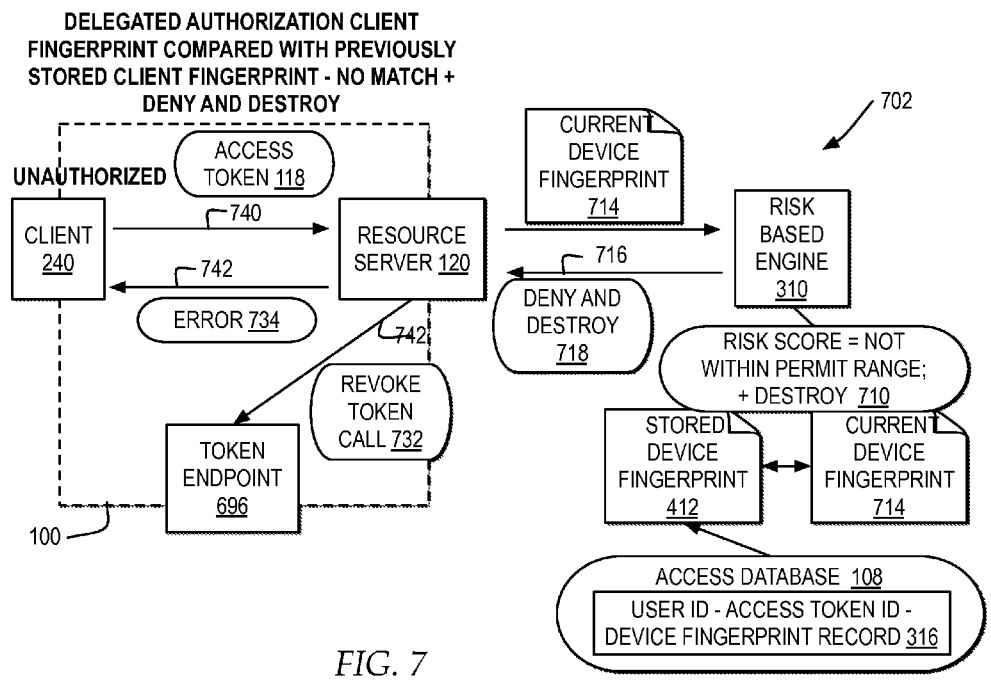
FIG. 7 is a block diagram illustrating one example of a delegated environment in which a resource server detects that there is not a match between a previously stored device fingerprint associated with an access token with a device fingerprint of a client currently presenting the access token, declines to allow the client delegated access to protected data, and automatically triggers destruction of the access token from the resource server endpoint within the delegated environment.

FIG. 7 illustrates a block diagram of one example of a delegated environment in which a resource server detects that there is not a match between a previously stored device fingerprint associated with an access token with a device fingerprint of a client currently presenting the access token, declines to allow the client delegated access to protected data, and automatically triggers destruction of the access token from the resource server endpoint within the delegated environment.

In the example illustrated at reference numeral 702, client 240, which was not issued access token 118 and is not authorized as a bearer or access token 118, has accessed a misappropriated version of access token 118, directly or indirectly. Client 240 presents access token 118 to resource server 120, as illustrated at reference numeral 740. In the example, when resource server 120 receives access token 118, resource server 120 parses a fingerprint of client 240 and calls risk based engine 310 with the parsed fingerprint of client 240, illustrated as current device fingerprint 714.

In the example illustrated at reference numeral 702, risk based engine 310 accesses, from access database 108, a record for access token 118, which includes a previously stored device fingerprint 412 of the client device that previously presented access token 118 to resource server 120. In the examples illustrated in FIG. 3, stored device fingerprint 412 is device fingerprint 320, captured from client 102 either concurrent with issuing access token 118 or upon the first presentation of access token 118 to resource server 120.

In the example illustrated at reference numeral 702, risk based engine 310 accesses one or more risk score factors and calculates a risk score indicating the probability that stored device fingerprint 412 matches with current device fingerprint 714. In one example, risk based engine 310 may compare a calculated risk score with a risk table that includes ranges of scores, where one range of scores is designated as a "not within permit range" of scores that indicate a match probability between stored device fingerprint 412 and current device fingerprint 614 indicative of the access token having been misappropriated and the current bearer not being the entity that the user intended to bear the access token. In one example, a risk score that is within the "not within permit range" may indicate that there are differences between stored device fingerprint and current device fingerprint 714 indicative of a misappropriation of access token 118. In the example illustrated, as illustrated at reference numeral 710, the calculated risk score is within the "not within permit range".

In addition, risk based engine 310 may also be set to trigger a "destroy" setting when a calculated risk score is within the "not within permit range" or based on other factors, such as a particular range of scores within the "not within permit range", a number of times access token 118 has been presented and denied, or other tracked information. In the example, risk based engine 310 calculates a risk score of "not within permit range" and also sets a "destroy" setting is set for current device fingerprint 714.

In the example, risk based engine 310 detects the risk score within the "not within permit range" and sets the "destroy" setting, as illustrated at reference numeral 710, and returns a permission response of deny and destroy 718, as illustrated at reference numeral 716. When resource server 120 receives a permission response of deny and destroy 718, resource server 120 denies any access to data identified in access token 118, generates an error message 734, and sends error message 734 to client 240, as illustrated at reference numeral 742. Error message 734 may include different types of information indicating why the access token request failed.

In addition, in the example, illustrated at reference numeral 702, when risk based engine 310 detects a "destroy" setting in deny and destroy 718, resource server 120 automatically generates revoke token call 732 to revoke access token 120 and calls token endpoint 696 with revoke token call 732, as illustrated at reference numeral 742. By enabling resource server 120 to detect a misappropriated access token from risk based engine 310 and to automatically trigger destruction of the misappropriated access token, resource server 120 provides an additional level of security to data resources secured by resource server 120.

Figure 8:
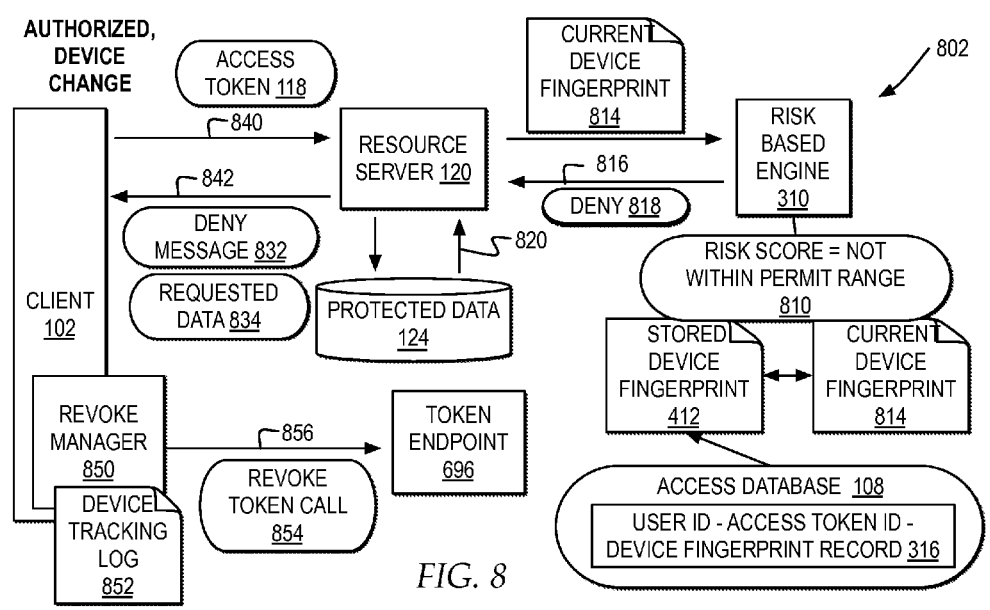
FIG. 8 is a block diagram illustrating one example of a delegated environment in which a resource server detects that there is not a match between a previously stored device fingerprint associated with an access token with a device fingerprint of a client currently presenting the access token, but is set to pass through the deny instruction to the client to determine whether action is required.

FIG. 8 illustrates a block diagram of one example of a delegated environment in which a resource server detects that there is not a match between a previously stored device fingerprint associated with an access token with a device fingerprint of a client currently presenting the access token, but is set to pass through the deny instruction to the client to determine whether action is required.

In the example illustrated at reference numeral 802, client 102, which is a client authorized to bear access token 118, presents access token 118 to resource server 120, as illustrated at reference numeral 840. In the example, client 102 is authorized to bear access token 118, however the device running client 102 is not the same device that was running client 102 when the initial device fingerprint was stored in access database 108 in association with access token 118. Resource server 120 captures and parses a device fingerprint of client 102, illustrated as current device fingerprint 814, and calls risk based engine 310 with current device fingerprint 814.

In the example illustrated at reference numeral 802, risk based engine 310 accesses, from access database 108, a record for access token 118, which includes a previously stored device fingerprint 412 of the client device that previously presented access token 118 to resource server 120. In the examples illustrated in FIG. 3, stored device fingerprint 412 is device fingerprint 320, captured from client 102 either concurrent with issuing access token 118 or upon the first presentation of access token 118 to resource server 120.

In the example illustrated at reference numeral 802, risk based engine 310 accesses one or more risk score factors and calculates a risk score indicating the probability that stored device fingerprint 412 matches with current device fingerprint 814. In one example, risk based engine 310 may compare a calculated risk score with a risk table that includes ranges of scores, where one range of scores is designated as a "not within permit range" of scores that indicate a match probability between stored device fingerprint 412 and current device fingerprint 814 indicative of the access token not currently being presented by the same client that was originally issued the access token. In the example illustrated, as illustrated at reference numeral 810, the calculated risk score is within the "not within permit range".

In the example illustrated at reference numeral 802, risk based engine 310 detects the risk score within the "not within permit range", as illustrated at reference numeral 810, and returns a permission response of deny 818, as illustrated at reference numeral 816. In the example, resource server 120 is set to pass through permission responses to the requesting client, without blocking access to protected data. When resource server 120 receives a permission response of deny 818, responsive to validating access token 118 as an issued, active access token, resource server 120 access protected data 124 as authorized by access token 118, as illustrated at reference numeral 820, and returns the protected data as requested data 834, as illustrated at reference numeral 842.

In addition, in the example illustrated at reference numeral 802, since resource server 120 is set to pass through permission responses to the requesting client, resource server 120 generates deny message 832 indicating that the permission response returned by risk based engine 310 is deny 818. Client 102 receives deny message 832 and calls a revoke manager 850 to determine whether to generate and issue a revoke token call 854 to a token endpoint 696, as illustrated at reference numeral 856. In one example, revoke manager 850 may access a device tracking log 852 in which revoke manager 850 for client 102 tracks device changes for client 102 at one or more intervals, or as device changes occur. In one example, a device change may include client 102 moving to execute on a new device. In another example, a device change may include client 102 moving to new networks, such as when client 102 is operating on a mobile device. Revoke manager 850 may determine, based on the entries in device tracking log 852, whether it is most likely that deny message 832 was generated by resource server 120 as a result of the types of changes to the device fingerprint caused by device changes during a particular period of time when access token 118 is submitted or whether it is more likely that deny message 832 was generated by resource server 120 as a result of access token 118 being misappropriated and being presented by an unauthorized client.

In the example illustrated at reference numeral 802, resource server 120 may be set to pass through permission responses determined by risk based engine 310 for client 102 to determine whether to take action and revoke an access token in situations where the device fingerprint of client 102 is subject to the type of change that would normally be interpreted by risk based engine 310 as indicative of an unauthorized client presenting a misappropriated access token. In the example, by including a pass through setting on resource server 120 to allow resource server 120 to continue to return protected data along with a message with the permission response from risk based engine 310, in situations where client 102 continues to present access token 118 from different device fingerprints, client 102 will not be blocked from access protected data. In addition, the example illustrated at reference numeral 802 with resource server 120 set to pass through permission responses from risk based engine 310 is not limited to situations in which client 102 may have a changing device fingerprint. In one example, to meet user, resource owner, or client performance requirements, resource server 120 may be set to pass through permission responses to requesting clients.

In the example, revoke manager 850 may be implemented as a functional layer or functional component of client 102. In another example, revoke manager 850 may be implemented as a service called by client 102. Revoke manager 850 may automatically monitor device changes that occur in client 102 or may wait for client 102 to push device changes. Revoke manager 850 may maintain entries in device tracking log 852 that reflect a history of changes that occur in client 102 over a particular period of time.

Figure 9:
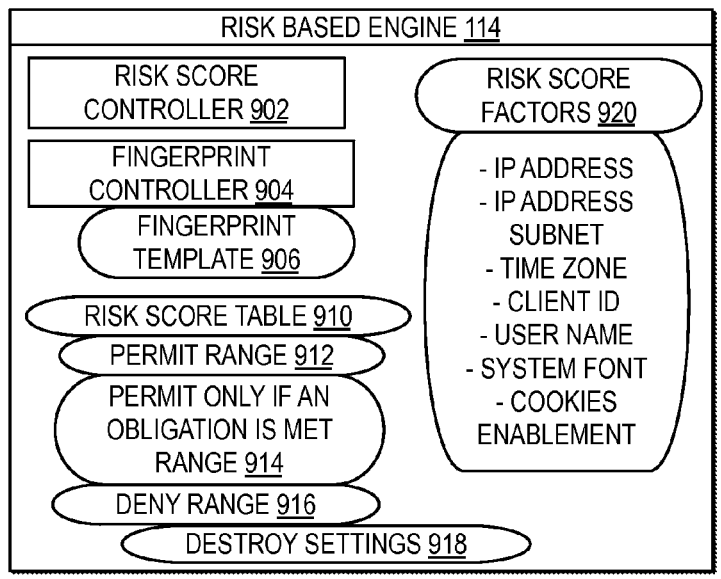
FIG. 9 is a block diagram illustrating one example of components of a risk based engine for identifying potentially misappropriated access tokens in a delegated environment.

FIG. 9 illustrates a block diagram of one example of components of a risk based engine for identifying potentially misappropriated access tokens in a delegated environment.

In the example, risk based engine 114 may include a fingerprint controller 904. Fingerprint controller 904 may retrieve client device data from a resource server, authorization server, or other endpoints. Fingerprint controller 904 may parse client device data to generate or filter device fingerprints according to one or more fingerprint templates, such as fingerprint template 906, that specify the types of data to store in device fingerprints with an access token. Fingerprint controller 904 may store a device fingerprint in access database 108 in association with the access token record. Fingerprint controller 904 may retrieve previously stored fingerprints from access database 108 according to access token identifier.

In one example, when risk based engine 114 is called with a device fingerprint, fingerprint controller 904 queries access database 108 to determine whether a fingerprint has already been stored in access database 108 with an access token identifier presented with the device fingerprint. In the example, if a device fingerprint has not already been stored in access database 108 with an access token identifier presented with the device fingerprint, then fingerprint controller 904 stores the new device fingerprint with the associated access token identifier in the access token record in access database 108. In the example, if a device fingerprint has already been stored in access database 108 with a record for the access token identifier presented with the device fingerprint, then fingerprint controller 904 retrieves the stored device fingerprint from access database 108.

In the example, risk based engine 114 may also include a risk score controller 902. Risk score controller 902, upon receipt of a new device fingerprint associated with an access token identifier and upon fingerprint controller 904 retrieving a stored device fingerprint associated with the access token identifier from access database 108, computes a risk score indicative of the probability that the new device fingerprint and the stored device fingerprint are from devices for the same client that is authorized to bear and present access token 118.

In the example, in calculating the risk score, risk score controller 902 may use risk score factors 920 to determine the weight to give one or more elements of a device fingerprint, in determining the probability that the new device fingerprint and the stored device fingerprint are from devices for the same client that is authorized to bear and present access token 118. In the example, risk score factors 920 may include one or more weights for one or more device fingerprint elements including, but are not limited to, matching IP addresses, matching IP address subnets, matching time zones, matching client identifiers, matching user names, matching system fonts, and matching cookie enablement.

In the example, in addition to calculating a risk score, risk score controller 902 may compare the risk score with one or more ranges specified in a risk score table 910. In one example, risk score table 910 may include a range of risk scores specified as a permit range 912, where if a calculated risk score falls within permit range 912, then risk based engine 114 returns a permission response of "permit" to the requesting endpoint.

In another example, risk score table 910 may include a range of risk scores specified as a deny range 916, where if a calculated risk score falls within deny range 916, then risk based engine 114 returns a permission response of "deny" to the requesting endpoint. In addition, in the example, risk score table 910 may include destroy settings 918, which may be set along with deny range 916. In one example, destroy settings 918 may be a configurable to automatically set a destroy setting if a risk score falls within deny range 916 or within a particular portion of deny range 916. In another example, destroy settings 918 may be a configurable to automatically set a destroy setting if a particular risk score factor reaches a threshold level, if an access token continues to be presented and the risk score calculated falls within deny range 916 a threshold number of times, or other configurable settings.

In another example, risk score table 910 may include a range of risk scores specified as a permit only if an obligation is met range 914, where if a calculated risk score falls within permit only if a condition is met range 914, then risk based engine 114 returns a permission response of "permit with obligations" to the requesting endpoint and may also specify one or more specific conditions or refer to one or more obligations or conditions that are regulated by the endpoint if the "permit with obligation" permission response is received.

In the example, the factors within risk score factors 920 and the ranges within risk score table 910 may be further specified according to one or more criteria including, but not limited to, the type of protected data, the access token specifications, the client identity, the endpoint identity, and other types and identifiers. For example, risk based engine 114 may be called by different resource server endpoints, where a different set of factors and endpoints is specified for each of the different resource server endpoints. In another example, the ranges specified in risk score table 910 may include one set of ranges specified for one type of protected data and another set of ranges specified for another type of protected data.

In the example, fingerprint controller 904 may also store, in access database 108, in association with an access token identifier, a misappropriation entry including information about any access for which risk score controller 902 calculates a risk score in deny range 916. In addition, fingerprint controller 904 may access, from access database 108, upon detection of a risk score within permit range 912, previously stored misappropriation entries from access database 108 and return messages with the previously stored misappropriation entry information to the resource server to pass to an authorized client.

Figure 10:
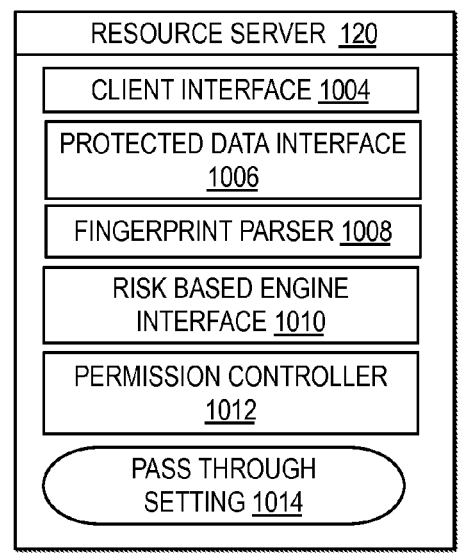
FIG. 10 is a block diagram illustrating one example of components of a resource server within a delegated environment.

FIG. 10 illustrates a block diagram of components of a resource server within a delegated environment.

In the example, resource server 120 may include one or more components operating within one or more software layers implementing one or more protocols. In the example, resource server 120 may specifically implement one or more components within a delegated protocol layer, such as a delegated protocol layer supported by OAuth 2.0.

In one example, resource server 120 includes a client interface 1004 for interfacing with one or more clients within a delegated environment, such as interfacing with client 102 and client 240. In one example, client interface 1004 provides an interface for resource server 120 to interface with clients to authenticate client identities, receive access tokens with requests for delegated access to protected data, and respond to the requests with delegated access to the protected data, with an error message, or with additional authentication requests.

In one example, resource server 120 includes a protected data interface 1006 for interfacing with protected data 124. In one example, protected data interface 1006 allows access to protected data if a user authenticates access to the data through presenting credentials 116 specified for the protected data. In another example, protected data interface 124 allows access to the data if a client presents an access token, permission controller 1012 evaluates that the access token has not been misappropriated, and protected data interface 1006 verifies that the access token is active and valid.

In one example, resource server 120 includes a fingerprint parser 1008 for acquiring, parsing, and filtering device information about a client submitting an access token. In one example, fingerprint parser 1008 may parse device information about a client submission of an access token including, but not limited to, an IP address, an IP subaddress, a time zone, a client ID, a user name, a system font, and a cookies enablement status. Fingerprint parser 1008 may filter the device information about a client and format the information into fields of a fingerprint record that can be stored in association with the record for the access token presented by the client. In one example, fingerprint parser 1008 may access information about a client submission of an access token that includes a time zone and a geographical location identifier within the time zone, but if the risk score factors only handle a time zone, then fingerprint parser 1008 only parses and stores the time zone within the device fingerprint for the client, in order to minimize computational and storage overhead. In another example, fingerprint parser 1008 may initiate a request for client interface 1004 to require additional information from a client submitting an access token if the information is required for a device fingerprint and the information is not accessible from the client submission of the access token and request for delegated access to protected data.

In one example, resource server 120 may include a risk based engine interface 1010. Risk based engine interface 1010 provides an interface between resource server 120 and a risk based engine, such as risk based engine 114. Risk based engine interface 1010 identifies an identifier for an access token submitted by a client and passes the access token identifier, along with a device fingerprint for the client from fingerprint parser 1008, to the risk based engine. By risk based engine interface 1010 passing the access token identifier and device fingerprint to risk based engine 114, risk based engine interface 1010 requests that risk based engine assess whether the access token may have been misappropriated and therefore the client presenting the access token is not authorized for delegated access to the protected data allowed through the access token.

In the example, risk based engine interface 1010 may receive one or more types of responses from a risk based engine. In one example, when risk based engine interface 1010 passes an access token identifier and device fingerprint to a risk based engine and the device fingerprint is stored with the access token identifier as the device fingerprint of the first client to present the access token, the risk based engine may return a confirmation response to risk based engine interface 1010, confirming that the device fingerprint was stored with the access token identifier upon the first presentation of the access token. In another example, when risk based engine interface 1010 passes an access token identifier and device fingerprint to a risk based engine and the risk based engine calculates a risk score based on the comparison of a previously stored device fingerprint with the new device fingerprint and determines a permission response for the risk score, the risk based engine may return a permission response to risk based engine interface 1010, indicating a level of permission to be granted to the client presenting the access token. In addition, in another example, when risk based engine interface 1010 passes an access token identifier and device fingerprint to a risk based engine, risk based engine interface 1010 may receive a response from the risk engine that includes a misappropriation entry providing information about a previous request that was denied for the same access token.

In one example, resource server 120 may include a permission controller 1012. Permission controller 1012 provides an interface for handling responses received by risk based engine interface 1010 from a risk based engine. In the example, if permission controller 1012 receives a response from risk based engine interface 1010 indicating a confirmation that a first device fingerprint was stored with an access token record or indicating a permission response of "permit", permission controller 1012 enables protected data interface 1006 to verify the access token and, if the access token is verified, to access the protected data designated in the access token. Along with receiving a permission response of "permit", if the response includes a misappropriation entry, permission controller 1012 places the misappropriation entry in an access warning message and sends the warning message to the client through client interface 1004. The access warning message may include authorization codes, access token identifiers, token endpoint information, and other identifiers for the client to place in a call to a token endpoint to automatically revoke the access token.

In the example, if permission controller 1012 receives a response from risk based engine interface 1010 indicating a permission response of "permit with obligations", permission controller 1012 enables one or more of client interface 1004 and protected data interface 1006 to manage client requests or other interactions required to meet the obligations, and if the obligations are met, enables protected data interface 1006 to verify the access token, and if the access token is verified, to access the protected data designated in the access token.

In the example, if permission controller 1012 receives a response from risk based engine interface 1010 indicating a permission response of "deny", permission controller 1012 first determines whether a pass through setting 1014 is set to pass through decisions to a client. If pass through setting 1014 is set to pass through decisions to a client, then permission controller 1012 triggers protected data interface 1006 to verify the access token, and if the access token is verified, to access the protected data designated in the access token, along with passing the permission response in a deny message through client interface 1004 to the client. The deny message may include additional information required for the client to automatically call a token endpoint to revoke the access token. If pass through setting 1014 is not set to pass through decisions to a client, then permission controller 1012 generates an error message indicating the access token cannot be used to access the protected data and sends the error message to the client through client interface 1004. In addition, permission controller 1012 determines whether the permission response of "deny" also includes a "destroy" setting. If permission controller 1012 determines that the permission response of "deny" also includes a "destroy" setting, then permission controller 1012 automatically calls a token endpoint to revoke the access token. Moreover, if pass through setting 1014 is not set to pass through decisions to a client, permission controller 1012 blocks protected data interface 1006 from accessing the protected data designated in the access token.

Figure 11:
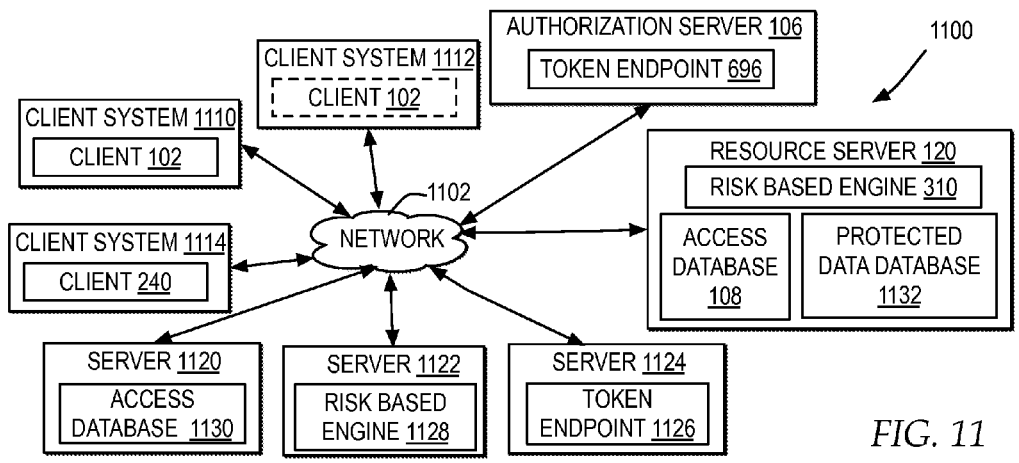
FIG. 11 is a block diagram illustrating one example of a network environment in which a delegated environment may be implemented.

With reference now to FIG. 11, a block diagram illustrates one example of a network environment in which a delegated environment may be implemented. One of ordinary skill in the art will appreciate that environment 1100 is illustrative of one type of network environment that may support clients, servers and other components of a delegated access environment. In addition, one of ordinary skill in the art will appreciate that the distribution of systems within network environment 1100 is illustrative of a distribution of systems, however, other distributions of systems within a network environment may be implemented.

As illustrated, multiple systems within network environment 1100 may be communicatively connected via network 1102, which is the medium used to provide communications links between various devices and computer systems communicatively connected. Network 1102 may include permanent connections such as wire or fiber optics cables and temporary connections made through telephone connections and wireless transmission connections, for example, and may include routers, switches, gateways and other hardware to enable a communication channel between the systems connected via network 1102. Network 1102 may represent one or more of broadcast television networks, including cable, satellite, and Internet based television networks across which programs are transmitted, packet-switching based networks, telephony based networks, local area and wire area networks, public networks, and private networks. Network environment 1100 may implement multiple types of network architectures.

Network 1102 and the systems communicatively connected within network environment 1100 via network 1102 may implement one or more layers of one or more types of network protocol stacks which may include one or more of a physical layer, a link layer, a network layer, a transport layer, a presentation layer, and an application layer. For example, network 1102 may implement one or more of the Transmission Control Protocol/Internet Protocol (TCP/IP) protocol stack or an Open Systems Interconnection (OSI) protocol stack. In addition, for example, network 1102 may represent the worldwide collection of networks and gateways that use the TCP/IP suite of protocols to communicate with one another. Network 1102 may implement a secure HTTP protocol layer or other security protocol for securing communications between systems. In addition, network 1102 may implemented a delegated protocol layer, such as delegated protocol layer 100, for distributing access tokens that enable a bearer of an access token to authenticate access to protected data and for managing access to protected data to client system presenting access tokens.

In the embodiment, as illustrated, a client system 1110, a client system 1112, and a client system 1114 are communicatively connected via network 1102 to one or more of authorization server 106, resource server 120, a server 1120, a server 1122, and a server 1124. Each of client system 1110, client system 1112, client system 1114, authorization server 106, resource server 120, server 1120, server 1122, and server 1124 may represent one or more computer systems, such as computer system 1200 of FIG. 12, to be described below.

In one example, client system 1110 hosts client 102 at one point in time when authorization server 106 issues an access token to client 102. In the example, client system 1112 may also host client 102 at another point in time, while the access token is still active and valid. Client system 1114 may host client 240, where client 240 is not authorized to bear the access token, but misappropriates the access token issued to client 102.

In the example, authorization server 106 may host token endpoint 696 and resource server 120 may host risk based engine 310, access database 108, and a protected data database 1132. Resource server 120, through risk based engine 310, automatically identifies and manages destruction of misappropriated access tokens, such as when client system 240, which is not authorized to bear the access token, presents the access token misappropriated from client 102, to resource server 120, to access protected data from protected data database 1132. In the example, resource server 120 parses device fingerprints for clients presenting the access token, where one or more properties of the device fingerprint for client 102 when presenting an access token from client system 1110 may differ from one or more properties of the device fingerprint for client 102 when presenting the access token from client system 1112. In one example, client system 1110 and client system 1112 may represent a same physical device, but different logical devices with different network addresses. In one example, client system 1110, client system 1112, and client system 1114 may represent general computer systems executing client 102 or client 240, through a browser or other interface, running client 102 or client 240 as functions of the browser or other interface, as plug-ins, as stand-alone functions, or as other executable components of the computer system. In one example, each of client system 1110, client system 1112, client system 1114, authorization server 106, resource server 120, server 1120, server 1122, and server 1124 may represent a networked environment including multiple server systems.

In one example, server 1124 may host a token endpoint 1126, in addition to, or in lieu of authorization server 106 hosting token endpoint 696. In another example, server 1122 may host a risk based engine 1128 accessible to one or more resource servers. In another example, server 1120 may host an access database 1130 in addition to or in lieu of access database 108. In another example, resource server 120 may provide an interface for accessing protected data database 1132, where protected data database 1132 is hosted in a database server system within an enterprise system.

Figure 12:
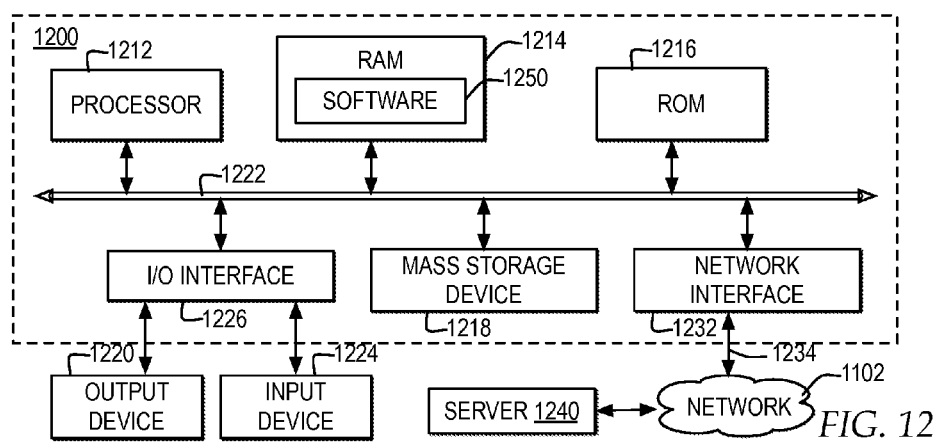
FIG. 12 is a block diagram illustrating one example of a computer system in which one embodiment of the invention may be implemented.

FIG. 12 illustrates a block diagram of one example of a computer system in which one embodiment of the invention may be implemented. The present invention may be performed in a variety of systems and combinations of systems, made up of functional components, such as the functional components described with reference to a computer system 1200 and may be communicatively connected to a network, such as network 1102.

Computer system 1200 includes a bus 1222 or other communication device for communicating information within computer system 1200, and at least one hardware processing device, such as processor 1212, coupled to bus 1222 for processing information. Bus 1222 preferably includes low-latency and higher latency paths that are connected by bridges and adapters and controlled within computer system 1200 by multiple bus controllers. When implemented as a server or node, computer system 1200 may include multiple processors designed to improve network servicing power. Where multiple processors share bus 1222, additional controllers (not depicted) for managing bus access and locks may be implemented.

Processor 1212 may be at least one general-purpose processor such as IBM® PowerPC® processor that, during normal operation, processes data under the control of software 1250, which may include at least one of application software, an operating system, middleware, and other code and computer executable programs accessible from a dynamic storage device such as random access memory (RAM) 1214, a static storage device such as Read Only Memory (ROM) 1216, a data storage device, such as mass storage device 1218, or other data storage medium. Software 1250 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 1212 may control the operations of flowchart of FIGS. 13-20 and other operations described herein. Operations performed by processor 1212 may be requested by software 1250 or other code or the steps of one embodiment of the invention might be performed by specific hardware components that contain hardwired logic for performing the steps, or by any combination of programmed computer components and custom hardware components. In one embodiment, one or more components of computer system 1200, or other components, which may be integrated into one or more components of computer system 1200, may contain hardwired logic for performing the operations of flowcharts FIGS. 13-20.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 1218, a random access memory (RAM), such as RAM 1214, a read-only memory (ROM) 1216, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 1200, partly on the user's computer, as a stand-alone software package, partly on the user's computer and partly on a remote computer or entirely on the remote computer or server, such as server 1240. In the latter scenario, the remote computer may be connected to the user's computer through any type of network, such as network 1102, through a communication interface, such as network interface 1232, over a network link that may be connected, for example, to network 1102.

In the example, network interface 1232 includes an adapter 1234 for connecting computer system 1200 to network 1102 through a link and for communicatively connecting computer system 1200 to server 1240 or other computing systems via network 1102. Although not depicted, network interface 1232 may include additional software, such as device drivers, additional hardware and other controllers that enable communication. When implemented as a server, computer system 1200 may include multiple communication interfaces accessible via multiple peripheral component interconnect (PCI) bus bridges connected to an input/output controller, for example. In this manner, computer system 1200 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 1200, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 1200, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 1232, the network link to network 1102, and network 1102 may use electrical, electromagnetic, or optical signals that carry digital data streams. The signals through the various networks and the signals on network 1102, the network link to network 1102, and network interface 1232 which carry the digital data to and from computer system 1200, may be forms of carrier waves transporting the information.

In addition, computer system 1200 may include multiple peripheral components that facilitate input and output. These peripheral components are connected to multiple controllers, adapters, and expansion slots, such as input/output (I/O) interface 1226, coupled to one of the multiple levels of bus 1222. For example, input device 1224 may include, for example, a microphone, a video capture device, an image scanning system, a keyboard, a mouse, or other input peripheral device, communicatively enabled on bus 1222 via I/O interface 1226 controlling inputs. In addition, for example, output device 1220 communicatively enabled on bus 1222 via I/O interface 1226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 12 may vary. Furthermore, those of ordinary skill in the art will appreciate that the depicted example is not meant to imply architectural limitations with respect to the present invention.

FIG. 13 illustrates one example of a high level logic flowchart of a process and program for a client managing a request to authorize access to protected data on behalf of a user through an access token which allows a client to access protected data without requiring the client to present the user authentication credentials.

In the example, the process and program starts at block 1300 and thereafter proceeds to block 1302. Block 1302 illustrates a determination whether a client request to access protected data on behalf of a user without requiring the client to present the user authentication credentials is triggered. In another example, block 1302 may be a determination whether a client request to receive an access token for protected data is received. At block 1302, if a client request to access protected data on behalf of a user without requiring the user authentication credentials is triggered, then the process passes to block 1304. Block 1304 illustrates the client managing an authentication request through one or more of the user and an authorization server to acquire an access token. Next, block 1306 illustrates a determination whether the client receives an access token for authenticating access to the protected data on behalf of the user before a timeout occurs or an error message is returned. At block 1306, if the client receives the access token before a timeout occurs or an error message is returned, then process passes to block 1310. Block 1310 illustrates storing the access token, and the process ends. Returning to block 1306, if the client does not receive an access token before a timeout occurs or an error message is returned, then the process passes to block 1308. Block 1308 illustrates handling the timeout or error message, and the process ends.

FIG. 14 illustrates one example of a high level logic flowchart of a process and program for a client managing a request to access protected data on behalf of a user by presenting an access token alone for authenticating access to the protected data.

In the example, the process starts at block 1400 and thereafter proceeds to block 1402. Block 1402 illustrates a client presenting an access token to a resource server to request access to a user's protected data, where the access token has been issued by an authorization server to allow the presenter of the access token to access a user's protected data without the client having to present the user's authentication credentials. Next, block 1404 illustrates a determination whether a response is received from the resource server before a timeout occurs. At block 1404, if a response is not received from the resource server before a timeout occurs, then the process passes to block 1412. Block 1412 illustrates handling the timeout, and the process ends.

Returning to block 1404, if a response is received from the resource server before a timeout occurs, then the process passes to block 1406. Block 1406 illustrates a determination whether the response includes the requested protected data. At block 1406, if the response does not include the requested protected data, then the process passes to block 1410. Block 1410 illustrates handling the non-data response, and the process ends. Returning to block 1406, if the response includes the requested protected data, then the process passes to block 1408. Block 1408 illustrates handling the response with the requested protected data. Next, block 1410 illustrates a determination whether the response with the requested protected data also includes a non-data message. At block 1414, if the response with the requested protected data does not also include a non-data message, then the process ends. At block 1414, if the response with the requested protected data also includes a non-data message, then the process passes to block 1410.

Figure 15:
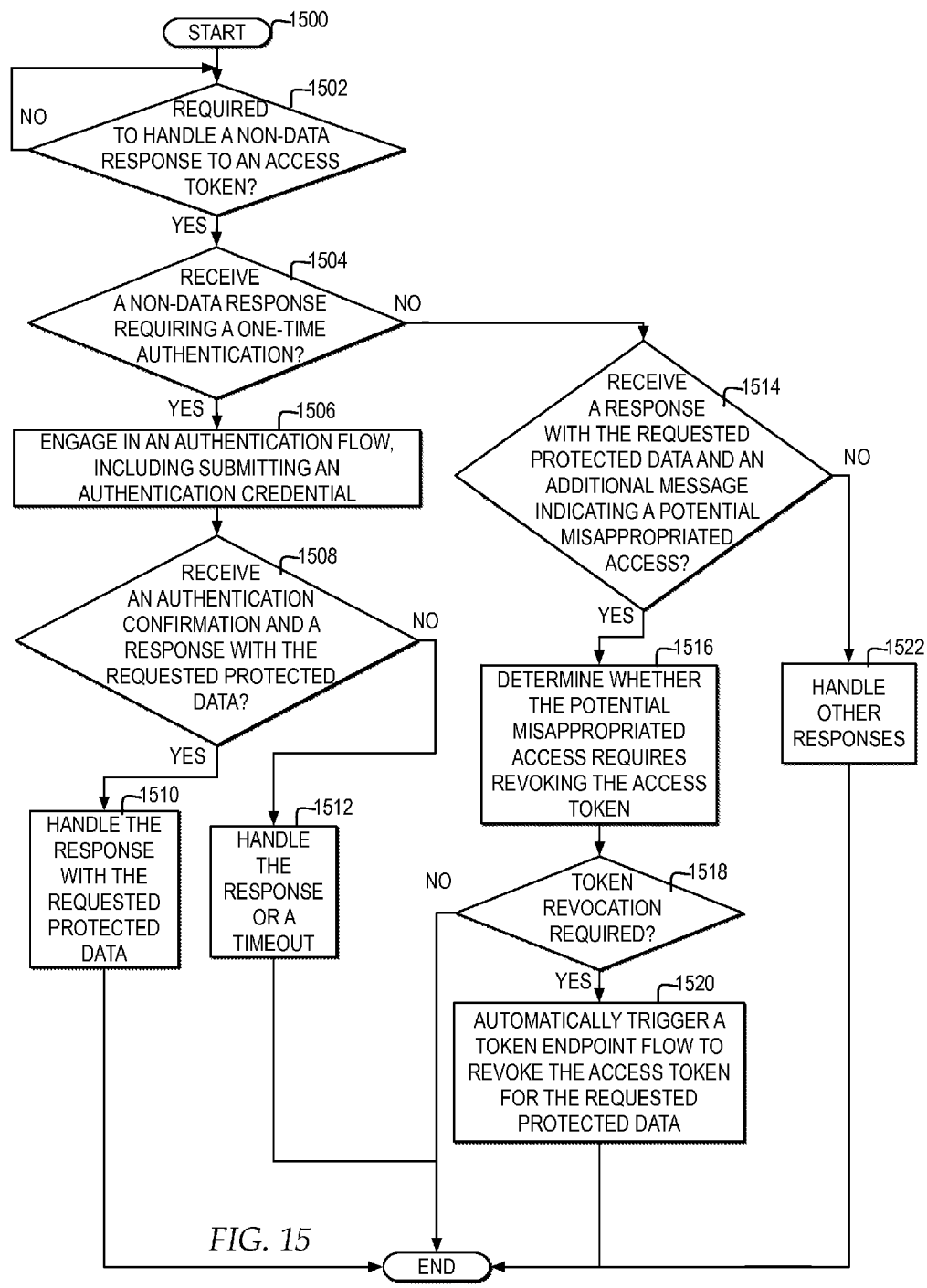
FIG. 15 is a high level logic flowchart of a process and program for handling non-data responses received by a client in response to the client present an access token to a resource server.

FIG. 15 illustrates a high level logic flowchart of a process and program for handling non-data responses received by a client in response to the client present an access token to a resource server.

In the example, the process starts at block 1500 and thereafter proceeds to block 1502. Block 1502 illustrates a determination whether the client is required to handle a non-data response to an access token request. In the example, at block 1502, if the client is required to handle a non-data response to an access token request, then the process passes to block 1504. Block 1504 illustrates a determination whether the client receives a non-data response requiring a one-time authentication. At block 1504, if the client receives a non-data response requiring a one-time authentication, then the process passes to block 1506. Block 1506 illustrates engaging in an authentication flow, including submitting an authentication credential. Next, block 1508 illustrates a determination whether an authentication confirmation and a response with the requested protected data is received. At block 1508, if an authentication confirmation and a response with the requested protected data is received, then the process passes to block 1510. Block 1510 illustrates handling the response with the requested protected data, and the process ends. Returning to block 1508, if an authentication confirmation and a response with the requested protected data is not received, then the process passes to block 1512. Block 1512 illustrates handling the response or a timeout, and the process ends.

Returning to block 1504, if the client does not receive a non-data response requiring a one-time authentication, then the process passes to block 1514. Block 1514 illustrates a determination whether a response is received with the protected data and an additional message indicating a potential misappropriated access. At block 1514, if a response is not received with the protected data and an additional message indicating a potential misappropriated access, then the process passes to block 1522. Block 1522 illustrates handling other responses, and the process ends. At block 1514, if a response is received with the protected data and an additional message indicating a potential misappropriated access, then the process passes to block 1516. Block 1516 illustrates determining whether the potential misappropriated access requires revoking the access token. At block 1516, the client may call a revoke manager to determine whether the misappropriated access requires revoking the access token. In another example, at block 1516, the client may also be set to automatically determine that for any indication that another client presented an access token and the resource server denied access to protected data, the potential misappropriated access requires revoking the access token. Next, block 1518 illustrates a determination whether a token revocation is required. At block 1518, if a token revocation is not required, then the process ends. At block 1518, if a token revocation is required, then the process passes to block 1520. Block 1520 illustrates automatically triggering a token endpoint flow to revoke the access token for the requested protected data, and the process ends.

Figure 16:
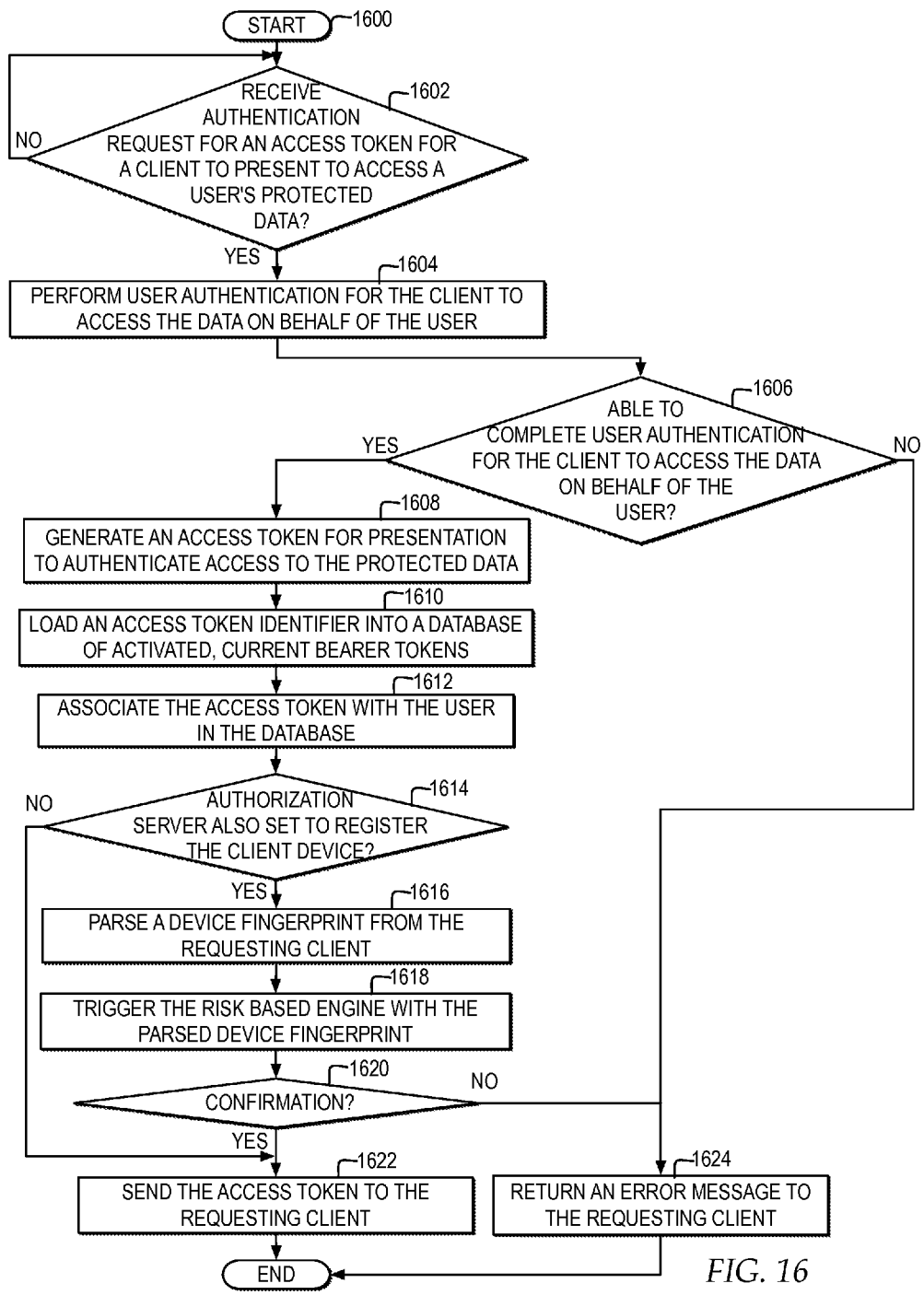
FIG. 16 is a high level logic flowchart of a process and program for an authorization server managing the distribution of an access token to a requesting client on behalf of a user, where the presenter of an access token is enabled to access the user's protected data without requiring the presenter of the access token to present the user's credentials or other authentication.

FIG. 16 illustrates a high level logic flowchart of a process and program for an authorization server managing the distribution of an access token to a requesting client on behalf of a user, where the presenter of an access token is enabled to access the user's protected data without requiring the presenter of the access token to present the user's credentials or other authentication.

In the example, the process and program starts at block 1600 and thereafter proceeds to block 1602. Block 1602 illustrates a determination whether an authorization server receives an authentication request from a client or a user for an access token for a client to present to access the user's protected data. At block 1602, if the authorization server receives an authentication request from a client or a user for an access token for a client to present to access the user's protected data, then the process passes to block 1604. Block 1604 illustrates performing user authentication for the client to access the data on behalf of the user whether through one or more authentication configurations in which the user's credentials for accessing the protected data are not required to be shared with the client. Next, block 1606 illustrates a determination whether the authorization server is able to complete the user authentication for the client to access the data on behalf of the user. At block 1606, if the authorization server is not able to complete the user authentication for the client to access the data on behalf of the user, then the process passes to block 1624. Block 1624 illustrates returning an error message to the requesting client, and the process ends.

Returning to block 1606, if the authorization server is able to complete the user authentication for the client to access the data on behalf of the user, then the process passes to block 1608. Block 1608 illustrates generating an access token for presentation to authenticate access to the protected data. Next, block 1610 illustrates loading the access token identifier into a database of activated, current access tokens. Thereafter, block 1612 illustrates associating the access token with the user in the database, and the process passes to block 1614.

Block 1614 illustrates a determination whether the authorization server is also set to register the client device. At block 1614, if the authorization server is not also set to register the client device, then the process passes to block 1622. Block 1622 illustrates sending the access token to the requesting client, and the process ends. Returning to block 1614, if the authorization server is set to register the client device, then the process passes to block 1616. Block 1616 illustrates parsing a device fingerprint from the requesting client. Next, block 1618 illustrates triggering a risk based engine with the parsed device fingerprint. Next, block 1620 illustrates a determination of whether the risk based engine returns a confirmation that the fingerprint was stored. At block 1620, if the risk based engine does not return a confirmation that the device fingerprint was stored, then the process passes to block 1624, and proceeds as previously described. At block 1620, if the risk based engine does return a confirmation that the device fingerprint was stored, then the process passes to block 1622, and proceeds as previously described.

Figure 17:
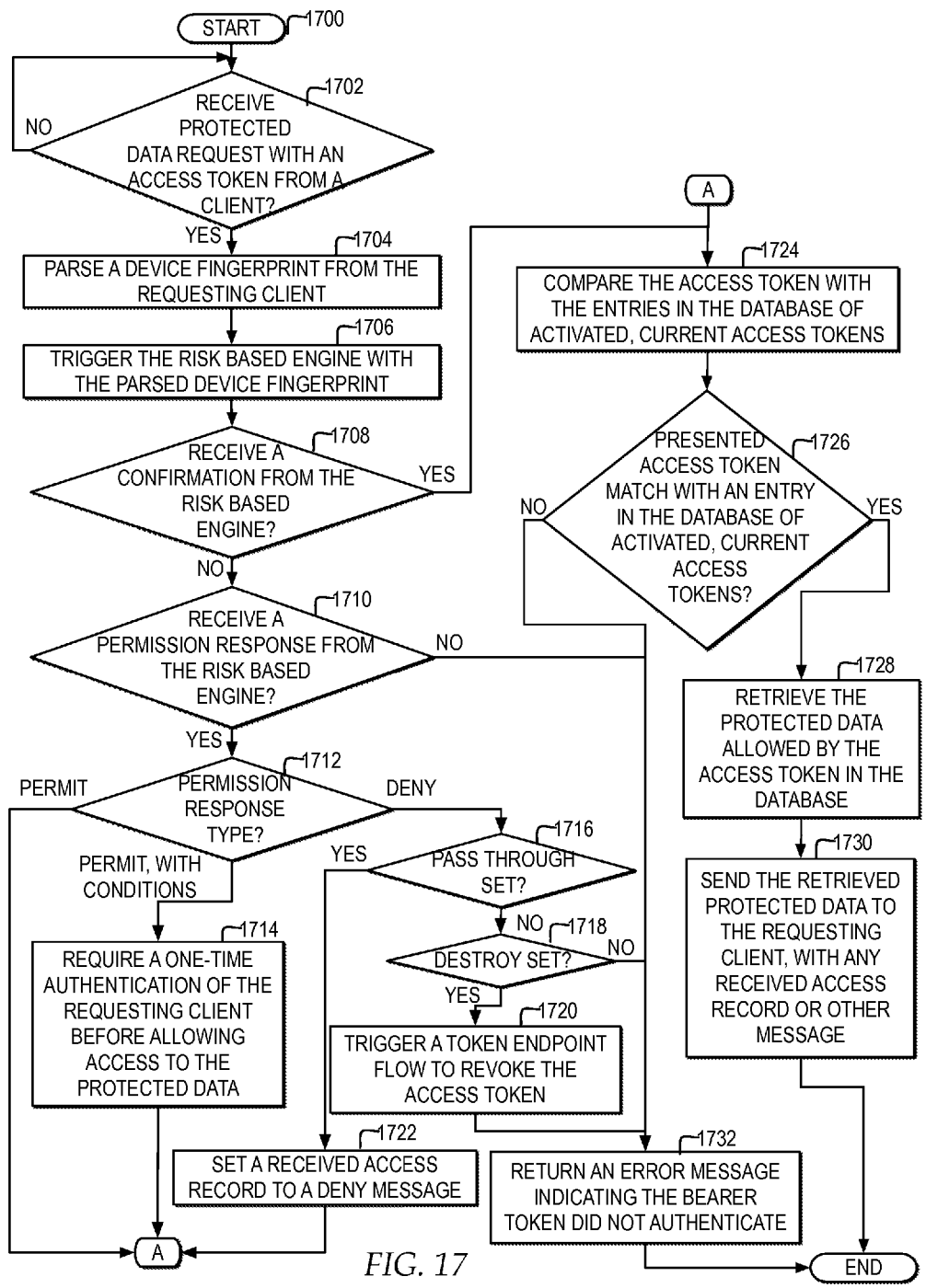
FIG. 17 is a high level logic flowchart of a process and program for a resource server managing responses to requests for protected data from a client presenting an access token, where the resource server identifies and manages destruction of misappropriated access tokens.

FIG. 17 illustrates a high level logic flowchart of a process and program for a resource server managing responses to requests for protected data from a client presenting an access token, where the resource server identifies and manages destruction of misappropriated access tokens.

In the example, the process and program starts at block 1700 and thereafter proceeds to block 1702. Block 1702 illustrates a determination whether the resource server receives an access token presented by a client, with a request for protected data. At block 1702, if a protected data request is received with an access token from a client, then the process passes to block 1704. Block 1704 illustrates parsing a device fingerprint from the request client. Next, block 1706 illustrates triggering the risk based engine with the parsed device fingerprint, and the process passes to block 1708.

Block 1708 illustrates a determination whether a confirmation is received from the risk based engine, where the confirmation indicates that the parsed device fingerprint for the requesting client was stored as the initial device fingerprint sample with the access token record in the access database. At block 1708, if a confirmation is received, then the process passes to block 1724. Block 1724 illustrates one example of verifying the access token by comparing the access token with the entries in the database of activated, current access tokens. Next, block 1726 illustrates a determination whether the presented access token matches an entry in the database of activated, current access tokens. At block 1726, if the presented access token does not match any entry in the database, then the process passes to block 1732. Block 1732 illustrates returning an error message indicating the access token did not authenticate the client for access to the protected data, and the process ends. Returning to block 1726, if the presented access token does match an entry in the database, then the process passes to block 1728. Block 1728 illustrates retrieving the protected data allowed by the access token in the database. Next, block 1730 illustrates sending the retrieved protected data to the requesting client, with any received access record or other message, and the process ends.

Returning to block 1708, if a confirmation is not received from the risk based engine, then the process passes to block 1710. Block 1710 illustrates a determination whether a permission response is received from the risk based engine. At block 1710, if a permission response is not received from the risk based engine, then the process passes to block 1732. At block 1710, if a permission response is received from the risk based engine, then the process passes to block 1712. Block 1712 illustrates a determination of the type of permission based response. At block 1712, if the permission based response received is a "permit" response, then the process passes to block 1724 for the access token to be verified before a delegated access is permitted to the protected data. At block 1712, if the permission based response received is a "permit with conditions" response, then the process passes to block 1714. Block 1714 illustrates requiring a one-time authentication of the requesting client before allowing access to the protected data by allowing the process to proceed to block 1724.

Returning to block 1712, if the permission based response received is a "deny" response, then the process passes to block 1716. Block 1716 illustrates a determination whether a pass through option is set. At block 1716, if a pass through option is set, then the process passes to block 1722. Block 1722 illustrates setting a received access record to a deny message, and the process passes to block 1724. The deny message may include a link to a token endpoint for the client to call to request to revoke the access token. Returning to block 1716, if a pass through option is not set, then the process passes to block 1718. Block 1718 illustrates a determination whether a destroy setting is set. At block 1718, if a destroy setting is not set, then the process passes to block 1732. At block 1718, if a destroy option is set, then the process passes to block 1720. Block 1720 illustrates triggering a token endpoint flow to revoke the access token, and the process passes to block 1732.

Figure 18:
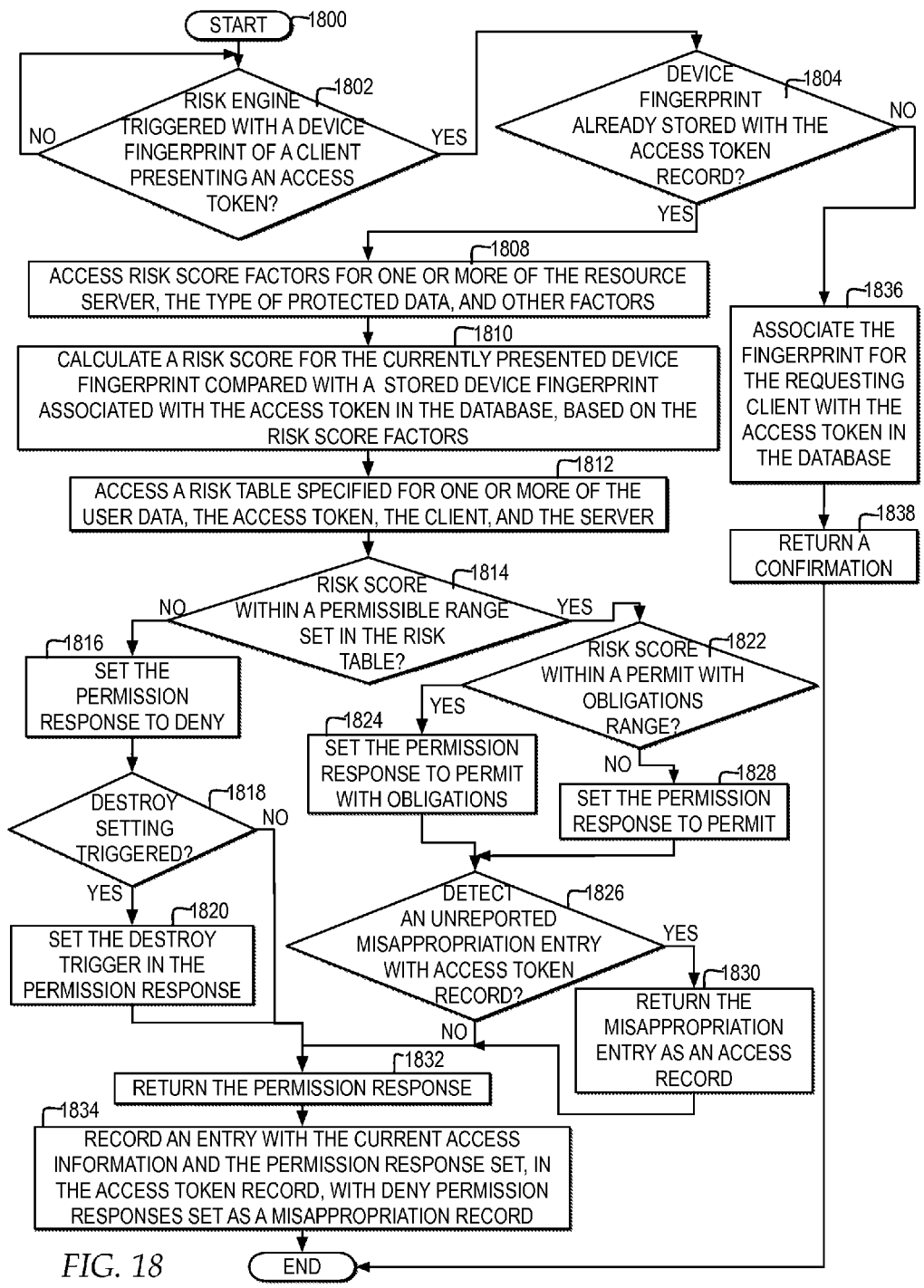
FIG. 18 is a high level logic flowchart of a process and program for a risk engine for storing a device fingerprint for a client submitting an access token and evaluating, on a subsequent presentation of the same access token, whether the device fingerprint on the subsequent presentation indicates the access token may have been misappropriated.

FIG. 18 illustrates a high level logic flowchart of a process and program for a risk engine for storing a device fingerprint for a client submitting an access token and evaluating, on a subsequent presentation of the same access token, whether the device fingerprint on the subsequent presentation indicates the access token may have been misappropriated.

In the example, the process and program starts at block 1800 and thereafter proceeds to block 1802. Block 1802 illustrates a determination whether the risk engine is triggered with a device fingerprint of a client presenting an access token. At block 1802, if a risk engine is triggered with a device fingerprint of a client presenting an access token, the process passes to block 1804. Block 1804 illustrates a determination whether a device fingerprint is already stored with the access token record in the database.

At block 1804, if a fingerprint is not already stored with the access token record in the database, then the process passes to block 1836. Block 1836 illustrates associating the device fingerprint for the requesting client with the access token record in the database. Next, block 1838 illustrates returning a confirmation, and the process ends.

Returning to block 1804, if a fingerprint is already stored with the access token record in the database, then the process passes to block 1808. Block 1808 illustrates accessing risk score factors for one or more of the resource server, the type of protected content, and other factors. Next, block 1810 illustrates calculating a risk score for the currently presented device fingerprint compared with a stored device fingerprint associated with the access token in the database, based on the risk score factors. Next, block 1812 illustrates accessing a risk table specified for one or more of the user data, the access token, the client and the server, where risk tables specifies ranges of risk scores that are permissible, ranges of risk scores that are permissible if conditions are met, and ranges of risk scores indicative of an access token having been misappropriated and submitted by an unauthorized client, and the process passes to block 1814.

Block 1814 illustrates a determination whether the calculated risk score is within a permissible range as specified in the risk table. At block 1814, if the calculated risk score is not within a permissible range as specified in the risk table, then the process passes to block 1816. Block 1816 illustrates setting a permission response to deny. Next, block 1818 illustrates a determination whether a destroy setting is triggered. At block 1818, if a destroy setting is not triggered, then the process passes to block 1832. Block 1832 illustrates returning the permission response. Next, block 1834 illustrates recording an entry with the current access information and the permission response set in the access token record, with deny permission responses set as a misappropriation record, and the process ends. Returning to block 1818, if a destroy setting is triggered, then the process passes to block 1820. Block 1820 illustrates setting the destroy trigger in the permission response, and the process passes to block 1832.

Returning to block 1814, if a risk score is not within a permission range set in the risk table, then the process passes to block 1822. Block 1822 illustrates a determination whether a risk score is within a permit with obligations range. At block 1822, if the risk score is within a permit with obligations range, then the process passes to block 1824. Block 1824 illustrates setting the permission response to permit with obligations, and the process passes to block 1826. At block 1822, if the risk score is not within a permit with obligations range, then the process passes to block 1828. Block 1828 illustrates setting the permission response to permit, and the process passes to block 1826.

Block 1826 illustrates a determination whether an unreported misappropriation entry is detected with the access token record. At block 1826, if an unreported misappropriation entry is not detected with the access token record, then the process passes to block 1832. At block 1826, if an unreported misappropriation entry is detected with the access token record, then the process passes to block 1830. Block 1830 illustrates returning the misappropriation entry as an access record, and the process passes to block 1832.

Figure 19:
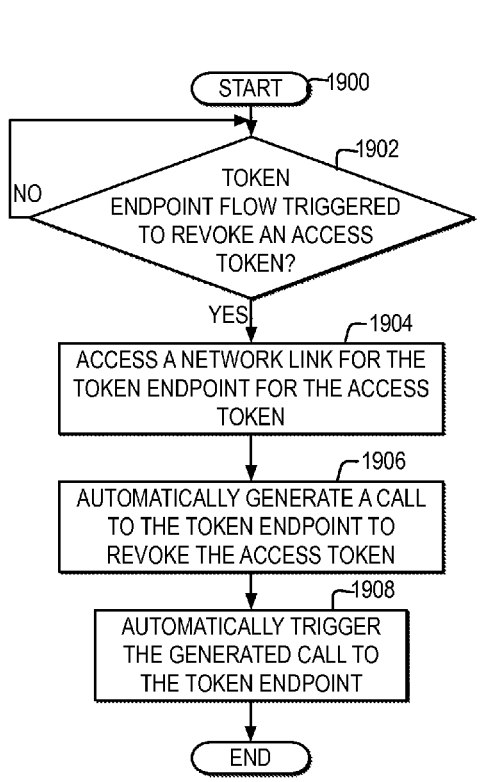
FIG. 19 is a high level logic flowchart of a process and program for managing a token endpoint flow.

FIG. 19 illustrates a high level logic flowchart of a process and program for managing a token endpoint flow. In the example, the process and program starts at block 1900 and thereafter proceeds to block 1902. Block 1902 illustrates a determination whether a token endpoint flow is triggered to revoke an access token. At block 1902, if a token endpoint flow is triggered to revoke an access token, then the process passes to block 1904. Block 1904 illustrates accessing a network link for the token endpoint extended to revoke the access token. The client may access the network link in one or more ways, including, but not limited to, determining the network link for the token endpoint for the authorization server from the access token itself and determining the network link for the token endpoint from a message received from the resource server. The resource server may access the network link in one or more ways including, but not limited to, accessing the authorization server address from the access token record itself and performing a lookup of the network link for the token endpoint. Block 1906 illustrates automatically generating a call to the token endpoint to revoke the access token. Next, block 1908 illustrates automatically triggering the generated call to the token endpoint, and the process ends.

Figure 20:
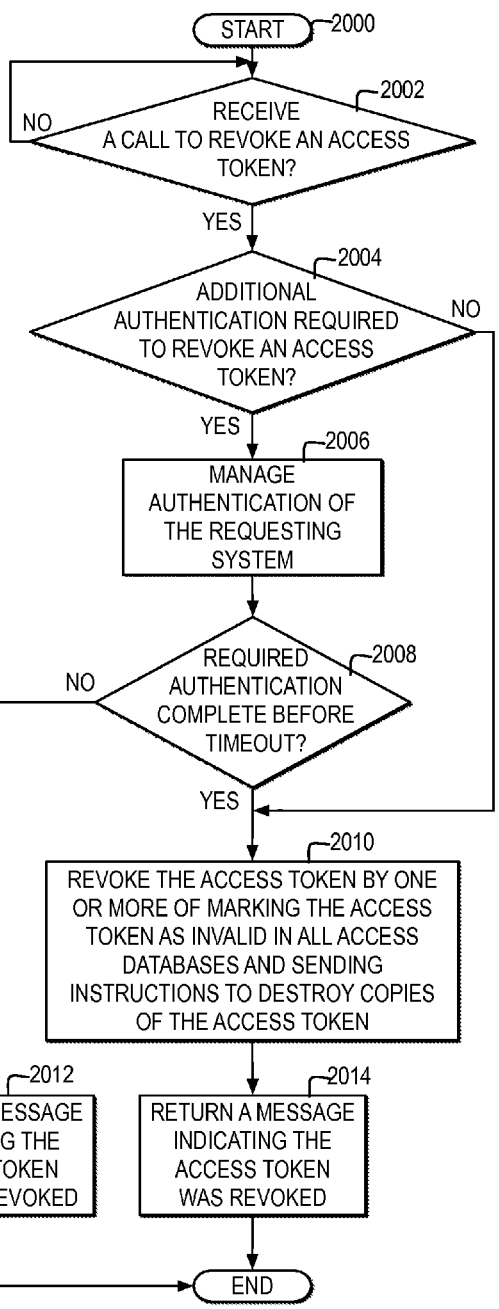
FIG. 20 illustrates a high level logic flowchart of a process and program for managing calls at a token endpoint to revoke an access token.

FIG. 20 illustrates a high level logic flowchart of a process and program for managing calls at a token endpoint to revoke an access token. In the example, the process and program starts at block 2000 and thereafter proceeds to block 2002. Block 2002 illustrates a determination whether a call to revoke an access token is received. At block 2002, if a call to revoke an access token is received, then the process passes to block 2004. Block 2004 illustrates a determination whether additional authentication is required to revoke an access token. At block 2004, if additional authentication is not required to revoke an access token, then the process passes to block 2010. Block 2010 illustrates revoking the access token by performing one or more of marking the access token as invalid in all access databases, removing the access token from all access databases in which valid access tokens are stored, and sending, through an out-of-bound mechanism, a notification to authorized clients that an access token has been destroyed, if applicable. Next, block 2014 illustrates returning a message indicating the access token was revoked, and the process ends.

Returning to block 2004, if additional authentication is required to revoke an access token, then the process passes to block 2006. Block 2006 illustrates managing authentication of the requesting system, which may include redirecting the requesting system to an authorization server to perform an authentication process. Next, block 2008 illustrates a determination whether the required authentication is completed before a timeout occurs. At block 2008, if the required authentication is not completed before a timeout occurs, then the process passes to block 2012. Block 2012 illustrates returning a message indicating the access token was not revoked, and the process ends. At block 2008, if the required authentication is completed before a timeout occurs, then the process passes to block 2010.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for identifying potentially misappropriated access tokens submitted by an unauthorized client in a delegated environment, comprising:
   receiving, by a computer, a request for protected user data with an access token presented by a client as authorization for the client to access the protected user data in a delegated environment;
   parsing, by the computer, the request to create a device fingerprint identifying the device submitting the request for the client;
   comparing, by the computer, the device fingerprint of the request to a previously stored device fingerprint of an authorized device associated with the access token; and
   automatically determining, by the computer, whether to identify the access token as potentially misappropriated based on the comparison of the device fingerprint of the request to the previously stored device fingerprint.

2. The method according to claim 1, further comprising:
   responsive to determining the access token is potentially misappropriated, denying, by the computer, the client submitting the request access to the protected user data.

3. The method according to claim 1, further comprising:
   responsive to determining the access token is potentially misappropriated, automatically destroying, by the computer, the bearer token by calling a token endpoint within a delegated environment.

4. The method according to claim 1, further comprising:
   responsive to determining the access token is not potentially misappropriated, allowing, by the computer, the client access to the protected user data by the request.

5. The method according to claim 1, wherein receiving, by a computer, a request for protected user data with an access token presented by a client for authorization for the client to access the protected user data further comprises:
   receiving, by the computer, the request for protected user data with the access token presented by the client, where a resource owner of the protected user data authorizes the creation of the access token for a bearer of the access token to present to authenticate access to the protected user data, where if the access token is misappropriated from an authorized bearer by an unauthorized bearer the unauthorized bearer also presents the access token to authenticate access to the protected user data.

6. The method according to claim 1, further comprising:
   responsive to determining the access token is not potentially misappropriated by the client submitting the access token, notifying, by the computer, the client that submitted the access token that there was an earlier determination that the access token was potentially misappropriated; and
   presenting, by the computer, a selectable option for the client to destroy the access token, wherein if the client selects the selectable option to destroy the access token, the client triggers a call to a token endpoint in the delegated environment to destroy the access token.

7. The method according to claim 1, further comprising:
   responsive to determining the access token is potentially misappropriated by the client and a pass through setting is set, allowing, by the computer, the client to access the protected data and notifying the client that the access token is potentially misappropriated, wherein the client determines whether to take action to destroy the access token based on historical device tracking indicative of the likelihood that the device fingerprint does not match the previous stored device fingerprint during the time period when the access token was presented.

8. The method according to claim 1, further comprising:
   comparing, by the computer, the device fingerprint of the request to a previously stored device fingerprint of an authorized device to calculate a risk score according to one or more risk score factors, wherein each one or more risk score factors is assigned a separate weight to apply to a difference in at least one characteristic of the device fingerprint compared with at least one characteristic of the previously stored device fingerprint;
   comparing, by the computer, the risk score with at least one range of scores assigned to a deny range; and
   responsive to the risk score falling within the at least one range of scores assigned to the deny range, automatically identifying, by the computer, the access token as potentially misappropriated in an access record for the access token specifying an identifier for the access token, the previously stored device fingerprint, and a misappropriation entry identifying the risk score.

9. The method according to claim 1, wherein parsing, by the computer, the request to create a device fingerprint identifying the device submitting the request for the client, further comprises:
   parsing, by the computer, the request to create a device fingerprint identifying at least one of an internet protocol address, an internet protocol subnet address, a time zone, a client identifier for the client, a user name, a system font setting, and a cookies enablement setting.

10. The method according to claim 1, further comprising:
determining whether there is a previously stored device fingerprint stored for the access token in an access token record specify an identifier for the access token;
responsive to determining there is not the previously stored device fingerprint for the access token, storing the device fingerprint with the access token record; and
responsive to determining there is the previously stored device fingerprint for the access token, comparing the device fingerprint of the request to a previously stored device fingerprint for the access token from the access token record.

11. A system for identifying potentially misappropriated access tokens submitted by an unauthorized user in a delegated environment, comprising:
one or more processors;
a memory coupled to at least one of the processors;
a set of computer program instructions stored in the memory and executed by at least one of the processors in order to perform the actions of:
receiving a request for protected user data with an access token presented by a client as authorization for the client to access the protected user data in a delegated environment;
parsing the request to create a device fingerprint identifying the device submitting the request for the client;
comparing the device fingerprint of the request to a previously stored device fingerprint of an authorized device associated with the access token; and
automatically determining whether to identify the access token as potentially misappropriated based on the comparison of the device fingerprint of the request to the previously stored device fingerprint.

12. The system according to claim 11, wherein the processors perform additional actions comprising:
determining the access token is potentially misappropriated, operative to deny the client submitting the request access to the protected user data.

13. The system according to claim 11, wherein the processors perform additional actions comprising:
responsive to determining the access token is potentially misappropriated, automatically destroying the bearer token by calling a token endpoint within a delegated environment.

14. The system according to claim 11, wherein the processors perform additional actions comprising:
responsive to determining the access token is not potentially misappropriated, allowing the client access to the protected user data by the request.

15. The system according to claim 11, wherein the processors perform additional actions comprising:
receiving the request for protected user data with the access token presented by the client, where a resource owner of the protected user data authorizes the creation of the access token for a bearer of the access token to present to authenticate access to the protected user data, where if the access token is misappropriated from an authorized bearer by an unauthorized bearer the unauthorized bearer also presents the access token to authenticate access to the protected user data.

16. The system according to claim 11, wherein the processors perform additional actions comprising:
responsive to determining the access token is not potentially misappropriated by the client submitting the access token, notifying the client that submitted the access token that there was an earlier determination that the access token was potentially misappropriated; and
presenting a selectable option for the client to destroy the access token, wherein if the client selects the selectable option to destroy the access token, the client triggers a call to a token endpoint in the delegated environment to destroy the access token.

17. The system according to claim 11, wherein the processors perform additional actions comprising:
responsive to determining the access token is potentially misappropriated by the client and a pass through setting is set, allowing the client to access the protected data and notifying the client that the access token is potentially misappropriated, wherein the client determines whether to take action to destroy the access token based on historical device tracking indicative of the likelihood that the device fingerprint does not match the previous stored device fingerprint during the time period when the access token was presented.

18. The system according to claim 11, wherein the processors perform additional actions comprising:
comparing the device fingerprint of the request to a previously stored device fingerprint of an authorized device to calculate a risk score according to one or more risk score factors, wherein each one or more risk score factors is assigned a separate weight to apply to a difference in at least one characteristic of the device fingerprint compared with at least one characteristic of the previously stored device fingerprint;
comparing the risk score with at least one range of scores assigned to a deny range; and
responsive to the risk score falling within the at least one range of scores assigned to the deny range, automatically identifying the access token as potentially misappropriated in an access record for the access token specifying an identifier for the access token, the previously stored device fingerprint, and a misappropriation entry identifying the risk score.

19. The system according to claim 11, wherein the processors perform additional actions comprising:
determining whether there is a previously stored device fingerprint stored for the access token in an access token record specify an identifier for the access token;
responsive to determining there is not the previously stored device fingerprint for the access token, storing the device fingerprint with the access token record; and
responsive to determining there is the previously stored device fingerprint for the access token, comparing the device fingerprint of the request to a previously stored device fingerprint for the access token from the access token record.

20. A computer program product for identifying potentially misappropriated access tokens submitted by an unauthorized client in a delegated environment, the computer program product comprising a computer readable storage medium having program code embodied therewith, the program code executable by a computer to:
receive, by the computer, a request for protected user data with an access token presented by a client as authorization for the client to access the protected user data in a delegated environment;
parse, by the computer, the request to create a device fingerprint identifying the device submitting the request for the client;
compare, by the computer, the device fingerprint of the request to a previously stored device fingerprint of an authorized device associated with the access token; and
automatically determine, by the computer, whether to identify the access token as potentially misappropriated based on the comparison of the device fingerprint of the request to the previously stored device fingerprint.

* * * * *